United States Patent
Iwamoto et al.

(10) Patent No.: US 8,768,064 B2
(45) Date of Patent: Jul. 1, 2014

(54) IMAGE FEATURE EXTRACTION DEVICE

(75) Inventors: Kota Iwamoto, Tokyo (JP); Ryoma Oami, Tokyo (JP)

(73) Assignee: NEC Corporation, Tokyo (JP)

(*) Notice: Subject to any disclaimer, the term of this patent is extended or adjusted under 35 U.S.C. 154(b) by 502 days.

(21) Appl. No.: 13/061,027

(22) PCT Filed: Jul. 14, 2009

(86) PCT No.: PCT/JP2009/003284
§ 371 (c)(1),
(2), (4) Date: Feb. 25, 2011

(87) PCT Pub. No.: WO2010/023809
PCT Pub. Date: Mar. 4, 2010

(65) Prior Publication Data
US 2011/0158538 A1    Jun. 30, 2011

(30) Foreign Application Priority Data
Sep. 1, 2008   (JP) .................. 2008-223389

(51) Int. Cl.
*G06K 9/46* (2006.01)

(52) U.S. Cl.
USPC .................... 382/190; 382/232; 382/251

(58) Field of Classification Search
CPC ............ H04N 19/0009; H04N 19/00945; H04N 19/00963; H04N 19/00969; H04N 19/00987; H04N 19/00157; H04N 19/00333
USPC ................... 382/190, 232, 251, 300
See application file for complete search history.

(56) References Cited

U.S. PATENT DOCUMENTS

| | | | |
|---|---|---|---|
| 5,533,138 A | 7/1996 | Kim et al. | |
| 5,760,846 A * | 6/1998 | Lee | 348/699 |
| 5,946,044 A * | 8/1999 | Kondo et al. | 348/458 |
| 6,115,480 A * | 9/2000 | Washizawa | 382/103 |
| 6,324,309 B1 * | 11/2001 | Tokuyama et al. | 382/300 |
| RE37,668 E * | 4/2002 | Etoh | 382/251 |
| 6,870,957 B1 | 3/2005 | Kasutani | |

(Continued)

FOREIGN PATENT DOCUMENTS

| JP | 05-292462 A | 11/1993 |
|---|---|---|
| JP | 2000-259832 A | 9/2000 |
| JP | 2001-167118 A | 6/2001 |

OTHER PUBLICATIONS

Hampapur et al., "Comparison of Distance Measures for Video Copy Detection", IEEE International Conference on Multimedia and Expo, pp. 944-947 (2001).

(Continued)

*Primary Examiner* — Vu Le
*Assistant Examiner* — Aklilu Woldemariam
(74) *Attorney, Agent, or Firm* — Dickstein Shapiro LLP

(57) ABSTRACT

This image feature extraction device extracts, from an image, an image feature that makes it possible to adjust the balance between identification capability and robustness, which are the scales of the capability of determining identity of images. This image feature extraction device executes hierarchical quantization to calculate quantization indexes of a plurality of hierarchies in accordance with a previously defined hierarchical quantization method for each quantization target region of an image, and outputs a hierarchical quantization index code, which is an encoding allowing unique specification of the quantization indexes of the respective hierarchies of each quantization target region.

6 Claims, 18 Drawing Sheets

(56) References Cited

U.S. PATENT DOCUMENTS

| | | | |
|---|---|---|---|
| 7,664,333 B2 | 2/2010 | Kasutani | |
| 7,778,468 B2* | 8/2010 | Kimura | 382/223 |
| 8,130,828 B2* | 3/2012 | Hsu et al. | 375/240.03 |
| 8,200,021 B2* | 6/2012 | Iwamoto et al. | 382/195 |
| 8,265,402 B2* | 9/2012 | Takada | 382/232 |
| 2006/0147108 A1* | 7/2006 | Kee et al. | 382/159 |

OTHER PUBLICATIONS

Iwamoto et al., "Image Signature Robust to Caption Superimposition for Video Sequence Identification", IEEE, pp. 3185-3188 (2006).

Kurozumi et al., "A Robust Video Search Method for Video Signal Queries Captured in the Real World", The IEICE Transactions on Information and Systems (Japanese Edition), vol. J90-D, No. 8, pp. 2223-2231 (2007).

* cited by examiner (※) NUMBER REPRESENTS QUANTIZATION INDEX (※) PART ENCLOSED BY DOT LINE REPRESENTS SET OF QUANTIZATION INDEXES QUANTIFIED BY ONE QUANTIZATION METHOD

FIG. 17

(a)
| QUANTIZATION TARGET REGION (1) | QUANTIZATION TARGET REGION (2) |
|---|---|
| QUANTIZATION TARGET REGION (3) | QUANTIZATION TARGET REGION (4) |

(b)
| QUANTIZATION INDEX (1) | QUANTIZATION INDEX (2) | QUANTIZATION INDEX (3) | QUANTIZATION INDEX (4) |
|---|---|---|---|

(c)
| NUMBER n OF QUANTIZATION TARGET | QUANTIZATION INDEX (1) | · · · | QUANTIZATION INDEX (n) |
|---|---|---|---|

IMAGE FEATURE EXTRACTION DEVICE

TECHNICAL FIELD

The present invention relates to a device configured to extract an image feature representing the feature of an image, more specifically, relates to an image feature extraction device configured to extract an image feature appropriate for determining an image copied by various alteration processes as an image identical to an original image in various image populations.

BACKGROUND ART

An image feature extraction device configured to extract an image feature representing the feature of an image is used, for example, to search for the similarity between images or moving images, which are collections of images. That is to say, the image feature extraction device compares the image features extracted from the respective images with each other to calculate an image similarity representing the degree of similarity between the images, and determines the similarity between the images.

A method for extracting an image feature for the purpose of searching for the similarity between images is described in, for example, Patent Documents 1 and 2. In the method described in these documents, an image feature appropriate for search for the similarity between images is extracted.

On the other hand, there is an image feature extraction device configured to extract an image feature for the purpose of detecting a copy of an image or a moving image, which is a collection of images. In this case, the image feature extraction device compares the image features extracted from the respective images with each other to calculate an identity scale representing the degree of identity of images, and compares the calculated identity scale with a certain threshold value to determine whether or not the images are identical (whether one of the images is a copy of the other).

When an image is copied, various alteration processes are usually executed. Various alteration processes include conversion of the compression format of an image, conversion of the compression ratio of an image, conversion of the size/aspect ratio of an image, adjustment of the color tone of an image, various filtering processes on an image (sharpening, smoothing), and so on. Moreover, various alteration processes include local processing on an image such as superimposition of a caption, and so on. Hereinafter, not only simply copying an image but also copying with execution of various alteration processes as mentioned above will be simply referred to as copying. Moreover, hereinafter, various alteration processes shall mean various alteration processes on an image as described above. Accordingly, in order to detect a copy of an image, an image feature extraction device is required to extract an image feature in a robust manner against various alteration processes (without being influenced by various alteration processes). Moreover, an image feature extraction device is required to extract image features that make it possible to calculate an identity scale allowing determination that an image copied by various alteration processes is an image identical to an original image when comparing image features.

A method for extracting an image feature robustly against various alteration processes for the purpose of detecting a copy of an image is described in Non-Patent Documents 1 to 3. In the method described in these documents, firstly, a feature is extracted from each of a plurality of local regions of an image, the extracted feature is quantized to calculate a quantization index, and the quantization index of each of the local regions is extracted as an image feature. When two images are compared, quantization indexes of corresponding local regions are compared, and an identity scale is calculated based on the number of local regions whose quantization indexes coincide.

In Non-Patent Document 1, the patterns of luminance distribution within local regions are classified into eleven types, which are referred to as quantization indexes.

Further, in Non-Patent Document 2, color information of a local region is normalized by a time interval and then subjected to linear scalar quantization, the result of which is referred to as a quantization index. An identity scale is calculated as a Hamming distance.

Furthermore, in Non-Patent Document 3 (a technique described as "Local Edge Representation" of Non-Patent Document 3), the position of the center of gravity of edge points extracted from a local region is quantized, which is regarded as a quantization index.

FIG. 1 is a block diagram showing a configuration of an image feature extraction device described in Non-Patent Documents 1 to 3. With reference to FIG. 1, the image feature extraction device described in Non-Patent Documents 1 to 3 is composed of an image feature extraction device 11.

With reference to FIG. 1, the image feature extraction device 11 is composed of a feature extraction unit 111 and a quantization index calculation unit 112. When an image is inputted, the feature extraction unit 111 extracts a feature for each of a plurality of previously defined local regions, and supplies the extracted feature of each of the local regions to the quantization index calculation unit 112. The quantization index calculation unit 112 quantizes the feature of each of the local regions supplied by the feature extraction unit 111 to calculate a quantization index, and outputs the quantization index of each of the local regions as a feature of the image.

Further, FIG. 2 is a block diagram showing a configuration of an image feature comparison device 12 configured to compare image features extracted by the image feature extraction device described in Non-Patent Documents 1 to 3 and calculate an identity scale representing the degree of identity of images. With reference to FIG. 2, the image feature comparison device 12 is composed of a quantization index comparison unit 121. The quantization index comparison unit 121 is supplied as inputs with quantization indexes of respective local regions of two images outputted by the image feature extraction devices 11, compares the quantization indexes for each corresponding local region, calculates an identity scale based on the number of local regions whose quantization indexes coincide, and outputs the identity scale.

The image feature extraction device with the configuration shown in FIG. 1 uses, as a feature, a quantization index calculated by quantizing a feature, and therefore, has robustness against some change of image signals resulting from various alteration processes on an image. Moreover, the image feature extraction device is capable of using a quantization index of each of local regions as a feature and calculating an identity scale based on the number of local regions whose quantization indexes coincide, and therefore, also has robustness against an alteration process like local processing on an image, such as superimposition of a caption.

[Patent Document 1] Japanese Unexamined Patent Application Publication No. 2000-259832 "Image Feature Amount Generator, Image Retrieval Device, and Generation Method and Retrieval Method Therefor"

[Patent Document 2] Japanese Unexamined Patent Application Publication No. 2001-167118 "Device and Method for Retrieving Picture, and Storage Medium with Similar Picture Retrieving Program Recorded Thereon"

[Non-Patent document 1] Kota Iwamoto, Eiji Kasutani, Akio Yamada, "Image signature Robust to Caption Superimposition for Video Sequence Identification," Proceedings of International Conference on Image processing (ICIP2006), 2006

[Non-Patent document 2] Takayuki Kurozumi, Hidehisa Nagano, Kunio Kasino, "Robust Video Search Method for Video Signal Queries Captured in the Real World," IEICE (the Institute Of Electronics, Information and Communication Engineers) Transactions Vol. J90-D No. 8, pp. 2223-2231, August 2007

[Non-Patent document 3] Arun Hampapur, Ruud M. Bolle, "Comparison of Distance Measures for Video Copy Detection," Proceedings of International Conference on Multimedia and Expo (ICME2001), p. 946, 2001

However, since the image feature extraction device with the configuration shown in FIG. 1 extracts one quantization index set quantized by one quantization method having been previously defined as an image feature, there is a problem that, in a case that extracted image features are compared and the identity of images is determined, the capability of determining identity of images is fixed by a quantization method to be used. Here, the capability of determining identity of images depends on two scales: identification capability, which is the degree of capability of identifying different images; and robustness, which is the degree of resistance of a quantization index to various alteration processes on an image. Identification capability and robustness have a trade-off relation. Fixation of the capability of determining identity of images also refers to fixation of the balance of identification capability and robustness.

SUMMARY

Accordingly, the present invention was made in consideration of the abovementioned problem, and an object of the present invention is to provide an image feature extraction device configured to extract, from an image, an image feature allowing adjustment of the balance between identification capability and robustness, which are the scales of the capability of determining identity of images.

A first image feature extraction device according to the present invention executes hierarchical quantization and calculation of quantization indexes of a plurality of hierarchies in accordance with a previously defined hierarchical quantization method for each quantization target region of an image, and outputs a hierarchical quantization index code, which is an encoding allowing unique specification of the quantization indexes of the respective hierarchies of each quantization target region.

According to the present invention, it is possible to extract, from an image, an image feature allowing adjustment of the balance between identification capability and robustness, which are the scales of the capability of determining identity of images.

BRIEF DESCRIPTION OF THE DRAWINGS

FIGS. 17A to 17C are diagrams showing examples of a data structure of a storing unit configured to store a hierarchical quantization index code in a ninth exemplary embodiment of the present invention.

EXEMPLARY EMBODIMENT

[First Exemplary Embodiment]

Figure 4:
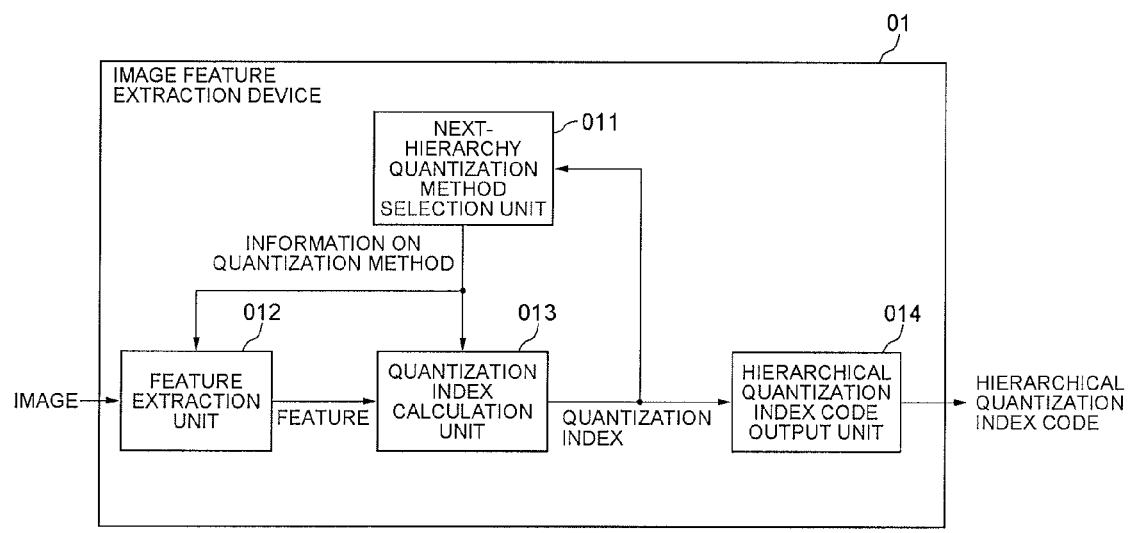
FIG. 4 is a block diagram showing a configuration of an image feature extraction device of the first exemplary embodiment of the present invention.

Next, a first exemplary embodiment of the present invention will be described in detail with reference to the drawings. FIG. 4 is a block diagram showing a configuration of an image feature extraction device 01 according to the first exemplary embodiment.

When an image is inputted, the image feature extraction device 01, for each previously defined quantization target region of the image, executes hierarchical quantization to calculate quantization indexes of a plurality of hierarchies in accordance with a hierarchical quantization method that is a previously defined method for hierarchically quantizing, calculates a hierarchical quantization index code that is an encoding allowing unique specification of the quantization indexes of the respective hierarchies of each quantization target region, and outputs the hierarchical quantization index code as a feature of the image. Here, allowing unique specification of the quantization indexes of the respective hierarchies of each quantization target region refers to allowing unique specification of the association between each quantization target region and a quantization index thereof as well as allowing unique specification of the quantization indexes of the respective hierarchies.

A quantization target region is a region subjected to calculation of a quantization index by hierarchical quantization. A quantization target region may be, for example, a plurality of local regions obtained by spatially dividing an image into regions. For example, a quantization target region may be a plurality of local regions (blocks) obtained by dividing an image into rectangular local regions (blocks) (the blocks may be partially overlapped with each other). In this case, for example, local regions may be defined on a normalized image obtained by normalizing the image size so as to respond to conversion of the image size. Moreover, for example, a whole image may be defined as one quantization target region. Moreover, a quantization target region does not need to be a spatial region of an image, and may be a partial region in the frequency region of image signals, for example. A quantization target region may be any region as far as quantization can be executed based on image signals.

Figure 6:
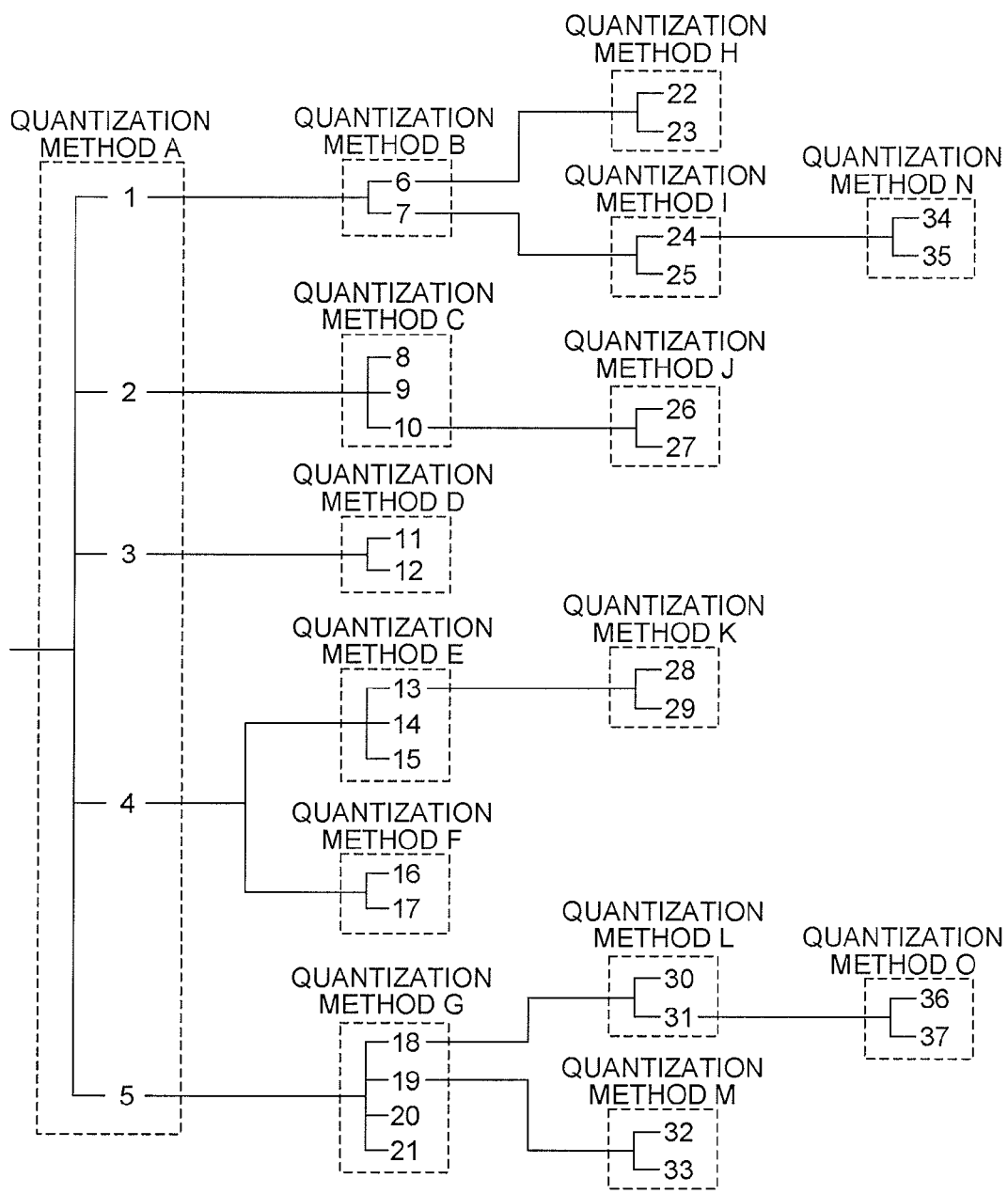
FIG. 6 is a diagram showing an example of a hierarchical quantization method.

A hierarchical quantization method is a method of classifying quantization target regions into a finite number of quantization indexes by a certain quantization method based on image signals and hierarchically classifying samples classified into the respective quantization indexes into a finite number of quantization indexes by other quantization methods. By executing hierarchical quantization in accordance with this method, quantization indexes of a plurality of hierarchies are calculated for each quantization target region. A quantization method refers to the type of a feature used for quantization and a procedure and/or a parameter for calculating a quantization index by quantizing the feature. In FIG. 6, one example of a hierarchical quantization method is schematically shown. In FIG. 6, a number represents a quantization index, and a part enclosed by a dot line represents a set of quantization indexes quantized by one quantization method. Hereinafter, FIG. 6 will be referred to for description of specific examples.

In a hierarchical quantization method, a quantization method for a lower hierarchy depends on a quantization index of a higher hierarchy thereof. That is to say, a quantization method (the type of a feature used for quantization, and a procedure and/or a parameter for calculating a quantization index by quantizing a feature) of a lower hierarchy varies depending on a quantization index of a higher hierarchy thereof (but the same quantization method may be used). With reference to FIG. 6, a quantization method for a lower hierarchy of quantization index 1 is quantization method B, and a quantization method for a lower hierarchy of quantization index 2 is quantization method C. Thus, different quantization methods are used. In this case, a feature used in quantization method B and a feature used in quantization method C may be different. Moreover, the type of a feature used in a quantization method for a higher hierarchy may be different from the type of a feature used in a quantization method for a lower hierarchy thereof.

Further, in a hierarchical quantization method, the number of quantization indexes classified in a lower hierarchy may vary depending on a quantization index of a higher hierarchy thereof. With reference to FIG. 6, the number of quantization indexes classified in a lower hierarchy of quantization index 1 is two, and the number of quantization indexes classified in a lower hierarchy of quantization index 5 is four. Thus, quantization indexes are classified into different numbers. Moreover, depending on a quantization index of a higher hierarchy, the depth of lower hierarchies thereof (the number of hierarchies) may vary. With reference to FIG. 6, the depth of lower hierarchies (the number of hierarchies) of quantization index 1 is three at the maximum (four, if the highest hierarchy is included), and the depth of lower hierarchies (the number of hierarchies) of quantization index 3 is one (two, if the highest hierarchy is included). Thus, the depths are different.

Further, in a hierarchical quantization method, a quantization method for the highest hierarchy needs to be a method of uniquely classifying all samples into a finite number of quantization indexes so that no sample remains unclassified. Moreover, a quantization method for a hierarchy other than the highest hierarchy needs to be a method of uniquely classifying all samples classified into a quantization index of a higher hierarchy thereof into a finite number of indexes so that no sample remains unclassified. With reference to FIG. 6, quantization method A as a quantization method for the highest hierarchy is a method of uniquely classifying all samples into quantization indexes 1, 2, 3, 4 and 5 so that no sample remains unclassified (for example, one sample is never classified into quantization indexes 1 and 2 at the same time). Moreover, for example, quantization method G is a method of uniquely classifying all samples classified into quantization index 5 of a quantization index of a higher hierarchy thereof, into quantization indexes 18, 19, 20 and 21 so that no sample remains unclassified (for example, one sample is never classified into quantization indexes 18 and 19 at the same time).

Further, in a hierarchical quantization method, a plurality of different quantization methods may exist in parallel for a quantization index of a higher hierarchy (a plurality of quantization methods for the highest hierarchy may exist in parallel) as far as the respective quantization methods satisfy the abovementioned conditions. With reference to FIG. 6, different quantization methods E and F exist in parallel for quantization index 4.

In a quantization method, as far as it is possible to execute quantization based on image signals, any feature may be used, and any procedure and/or parameter may be used for calculation of a quantization index by using the feature. For example, a quantization method may be a method of extracting a feature of a scalar amount (e.g., the average luminance value of an image) from a quantization target region and executing linear scalar quantization or nonlinear scalar quantization on the feature. Moreover, for example, a quantization method may be a method of extracting a feature of a vector amount (e.g., the luminance histogram of an image) from a quantization target region and executing vector quantization on the feature. Any parameter may be used for scalar quantization and vector quantization. Moreover, for example, a quantization method may be based on not a simple arithmetic operation but a rule. For example, a quantization method may be a method of extracting a feature relating to the magnitude and direction of gradient of an image from a quantization target region and classifying into five quantization indexes in total: classifying into a quantization index representing "no gradient" in a case that the magnitude is lower than a defined amount, whereas classifying the direction of the gradient into four directions in other cases.

In a hierarchical quantization method, considering robustness essentially becomes higher as quantization indexes of a higher hierarchy are selected as a set of quantization indexes used for comparison, it is desirable that a quantization method for a higher hierarchy is a method that is more robust against various alteration processes on an image, namely, a method by which a calculated quantization index is harder to change against various alteration processes (it is desirable but not necessarily needed). With reference to FIG. 6, for example, it is desirable that quantization method A is more robust than quantization methods B, C, D, E, F and G. For example, generally, in a case that a quantization method using the gradient of luminance components of an image as a feature is more robust than a quantization method using color components of an image as a feature, the former quantization method is more desirable for a higher hierarchy than the latter quantization method. The robustness of a certain quantization method can be measured by, for example, executing various alteration processes on a group of images for learning to generate copy images, calculating a quantization index for each quantization target region by the quantization method from each of the original images and the copy images, and measuring by a ratio of coincidence of quantization indexes between the corresponding quantization target regions. It can be said that a quantization method with higher coincidence ratio is more robust against various alteration processes on an image. For design of a hierarchical quantization method, for example, the hierarchical quantization method may be configured based on robustness measured by the abovementioned method so that a quantization method with higher robustness is employed for a higher hierarchy than a quantization method with lower robustness.

Further, it is desirable that a quantization method for each hierarchy of a hierarchical quantization method is such a quantization method that, with respect to a general image that does not suppose a specific population, samples are classified as uniformly as possible into a plurality of quantization indexes to be classified by the quantization method (it is desirable but is not necessarily needed). With reference to FIG. 6, it is desirable that, when quantization is executed by quantization method A with respect to a general image that does not suppose a specific population, samples are classified into quantization indexes 1, 2, 3, 4 and 5, respectively, in a degree as uniform as possible. For design of a hierarchical quantization method, a parameter for a quantization method may be set so that samples are classified as uniformly as possible with respect to a group of images for learning, for example.

Further, it is desirable that a hierarchical quantization method is a method in which, for a general group of images that does not suppose a specific population, a set of quantization indexes calculated by a quantization method for the highest hierarchy has identification capability, which is the degree of capability of sufficiently identifying different images (it is desirable but is not necessarily needed). With reference to FIG. 6, it is desirable that, for a general image that does not suppose a specific population, quantization indexes 1, 2, 3, 4 and 5 calculated by quantization method A have sufficient identification capability. For example, in a case that the number of quantization indexes calculated by a quantization method for the highest hierarchy is too small (e.g., two), sufficient identification capability cannot be obtained, which is undesirable (but is possible). Moreover, in a hierarchical quantization method, as the number of quantization indexes calculated by a quantization method for a hierarchy other than the highest hierarchy is smaller, it is easier to make the appearance frequencies of quantization indexes uniform (i.e., the degree of freedom of adjustment is higher), which is desirable (but is not necessarily needed). It is desirable that, as shown in FIG. 6, the number of quantization indexes calculated by a quantization method for the highest hierarch is the largest (five) and the numbers of quantization indexes calculated by quantization methods for lower hierarchies thereof are smaller than five (two, three and four) (but is not necessarily needed). For example, it is desirable that the number of quantization indexes calculated by a quantization method for the highest hierarchy is about ten and the number of quantization indexes calculated by a quantization method for a lower hierarchy thereof is two (i.e., samples are evenly divided).

With reference to FIG. 4, the image feature extraction device 01 includes a next-hierarchy quantization method selection unit 011, a feature extraction unit 012, a quantization index calculation unit 013, and a hierarchical quantization index code output unit 014.

The next-hierarchy quantization method selection unit 011, in a case that a quantization index (of a higher hierarchy) is supplied, selects a quantization method for a lower hierarchy corresponding to the quantization index and, in a case that a quantization index is not supplied, selects a quantization method for the highest hierarchy, in accordance with a previously defined hierarchical quantization method for each quantization target region. The next-hierarchy quantization method selection unit 011 then supplies information on the selected quantization method to the feature extraction unit 012 and the quantization index calculation unit 013. A quantization index inputted into the next-hierarchy quantization method selection unit 011 is information fed back by the quantization index calculation unit 013 described later. With reference to FIG. 6, in a case that a quantization index is not supplied, quantization method A of a quantization method for the highest hierarchy is selected. Moreover, for example, in a case that quantization index 6 is supplied by the quantization index calculation unit 013, quantization method H of a quantization method for a lower hierarchy of quantization index 6 is selected. In a hierarchical quantization method, in a case that a plurality of different quantization methods exist in parallel for a lower hierarchy of a certain quantization index (or for the highest hierarchy), the next-hierarchy quantization method selection unit 011 selects the respective quantization methods and supplies information on the respective quantization methods. With reference to FIG. 6, in a case that quantization index 4 is supplied, the next-hierarchy quantization method selection unit 011 selects and supplies quantization methods E and F existing in parallel for a lower hierarchy of quantization index 4, respectively.

The feature extraction unit 012 extracts a feature used by the quantization method from an inputted image in accordance with information on a quantization method supplied by the next-hierarchy quantization method selection unit 011, and supplies the extracted feature to the quantization index calculation unit 013, for each quantization target region. In a hierarchical quantization method, in a case that a plurality of different quantization methods exist in parallel for a lower hierarchy of a certain quantization index (or for the highest hierarchy) and therefore information on the plurality of quantization methods is supplied, the feature extraction unit 012 extracts and supplies features used by the respective quantization methods. The feature extraction unit 012 may be configured to extract all necessary features in advance and, when supplied with information on a quantization method by the next-hierarchy quantization method selection unit 011, output the feature. Moreover, the feature extraction unit 012 may be configured to, in a case that a necessary feature has already been used by a quantization method for a higher hierarchy, hold the feature and output as it is without extracting it again.

The quantization index calculation unit 013, for each quantization target region, quantizes a feature supplied by the feature extraction unit 012 in accordance with information on a quantization method supplied by the next-hierarchy quantization method selection unit 011, and calculates a quantization index. In a case that the calculated quantization index is not of the lowest hierarchy, that is, in a case that a quantization method for a lower hierarchy still exists, the quantization index calculation unit 013 supplies (feeds back) the calculated quantization index to the next-hierarchy quantization method selection unit 011. Moreover, in a case that the calculated quantization index is of the lowest hierarchy, the quantization index calculation unit 013 supplies the calculated quantization index to the hierarchical quantization index code output unit 014. The quantization index calculation unit 013 may be configured to, every time calculating a quantization index of each hierarchy instead of only when calculating a quantization index of the lowest hierarchy, supply the calculated quantization index to the hierarchical quantization index code output unit 014. With reference to FIG. 6, quantization indexes 8, 9, 11, 12, 14, 15, 16, 17, 20, 21, 22, 23, 25, 26, 27, 28, 29, 30, 32, 33, 34, 35, 36 and 37 are of the lowest hierarchies, and the other quantization indexes are not of the lowest hierarchies. In the hierarchical quantization method, in a case that a plurality of different quantization methods exist in parallel for a lower hierarchy of a certain quantization index (or for the highest hierarchy) and therefore information on the plurality of quantization methods is supplied, the quantization index calculation unit 013 executes quantization by the respective quantization methods to calculate and supply quantization indexes, respectively. With reference to FIG. 6, in a case that information on quantization methods E and F is supplied, the quantization index calculation unit 013 calculates quantization indexes by the respective quantization methods.

When a quantization index of the lowest hierarchy is supplied by the quantization index calculation unit 013 for each quantization target region, the hierarchical quantization index code output unit 014 calculates and outputs a hierarchical quantization index code, which is an encoding allowing unique specification of quantization indexes of respective hierarchies of each quantization target region (the respective quantization indexes calculated by the quantization index calculation unit 013). A hierarchical quantization index code allows unique specification of quantization indexes of respective hierarchies for each quantization target region. A hierarchical quantization index code can be any encoding that allows unique decoding. With reference to FIG. 6, for example, when quantization index 27 is supplied as a quantization index of the lowest hierarchy, quantization indexes of respective hierarchies are quantization indexes 2, 10 and 27 in the order from the highest hierarchy, and a hierarchical quantization index code can be any encoding allowing specification of the quantization indexes of the respective hierarchies as quantization indexes 2, 10 and 27. However, in a hierarchical quantization method, in a case that a plurality of different quantization methods exist in parallel for a lower hierarchy of a certain quantization index (or for the highest hierarchy) and thus quantization indexes for a plurality of different lowest hierarchies are supplied, a hierarchical quantization index code can be any encoding allowing unique specification of the quantization indexes of the respective hierarchies for each of the quantization indexes of the lowest hierarchies. With reference to FIG. 6, for example, a hierarchical quantization index code can be any encoding that, in a case that quantization indexes 28 and 17 are supplied as quantization indexes of the lowest hierarchies, can uniquely specify (the respective hierarchical quantization paths of) quantization indexes 4, 13 and 28 and quantization indexes 4 and 17 (quantization index 4 is common), which are quantization indexes of the respective hierarchies for each of the quantization indexes of the lowest hierarchies.

For example, a hierarchical quantization index code may be obtained by encoding only a quantization index of the lowest hierarchy of each quantization target region. This is because the hierarchical quantization method as shown in FIG. 6 is shared by an extracting side (the image feature extraction device) and a comparing side (the image feature comparison device) and, if the respective sides can refer to, it is possible to uniquely specify quantization indexes of higher hierarchies from a quantization index of the lowest hierarchy. With reference to FIG. 6, for example, assuming a quantization index of the lowest hierarchy is quantization index 27, only quantization index 27 may be encoded (quantization indexes 2 and 10 of higher hierarchies can be uniquely specified from quantization index 27 in accordance with the hierarchical quantization method). Moreover, a hierarchical quantization index code may be obtained by encoding quantization indexes of all hierarchies including a quantization index of the lowest hierarchy. With reference to FIG. 6, for example, assuming a quantization index of the lowest hierarchy is quantization index 27, quantization indexes 2, 10 and 27 of all hierarchies may be encoded. Since the code size is smaller in the former case, the former case is more desirable in general. In the latter case, the code size is large. However, it is unnecessary to reproduce, from the quantization index of the lowest hierarchy, quantization indexes of higher hierarchies corresponding to the quantization index of the lowest hierarchy when comparing hierarchical quantization index codes, and hence there is a merit that the amount of operation can be reduced. Moreover, a hierarchical quantization index code can be any encoding allowing unique specification of the association of each quantization target region and a quantization index thereof. For example, a hierarchical quantization index code may be obtained by encoding in accordance with a previously defined order of quantization target regions. Moreover, for example, a hierarchical quantization index code may be obtained by encoding while adding information that can specify a quantization target region.

It is desirable that the hierarchical quantization method described above is common to all quantization target regions, but it may vary for each quantization target region or for each group of quantization target regions (quantization target regions are a plurality of local regions of an image, e.g., in an image, a group of local regions belonging to an upper left region, a group of local regions belonging to an upper right region, a group of local regions belonging to a lower left region, and a group of local regions belonging to a lower right region). That is to say, for example, a hierarchical quantization method may vary for each quantization target region or for each group of quantization target regions. By thus varying a hierarchical quantization method for each quantization target region or for each group of quantization target regions, it is possible to optimize so as to fit to the property of each quantization target region or each group of quantization target region. For example, in a case that quantization target regions are a plurality of local regions of an image, assuming it is highly probable that a central region of the image is a foreground object and a peripheral region of the image is a background, by utilizing this property, a hierarchical quantization method composed of quantization methods appropriate for describing a foreground object (e.g., quantization methods using edge information as a feature) may be used for the local region belonging of the central region of the image, and a hierarchical quantization method composed of quantization methods appropriate for describing a background (e.g., quantization methods using color information as a feature) may be used for the local region belonging to the peripheral region of the image.

[Description of Operation]

Figure 7:
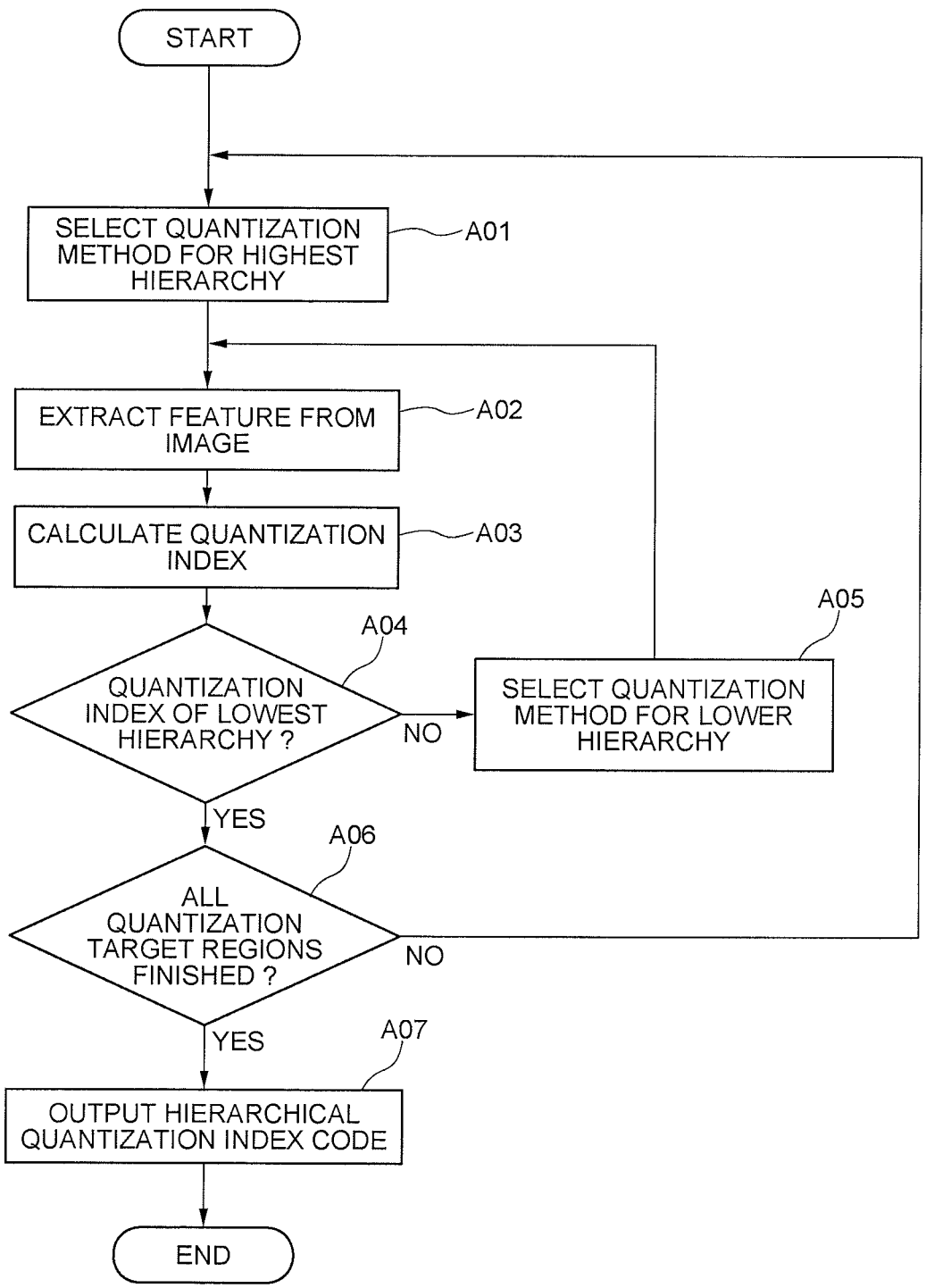
FIG. 7 is a flowchart showing an operation of the image feature extraction device of the first exemplary embodiment of the present invention.

Next, an operation of the image feature extraction device 01 of the first exemplary embodiment will be described by using a flowchart of FIG. 7. FIG. 7 shows a flowchart of the operation of the image feature extraction device 01 in the first exemplary embodiment.

First, for a first quantization target region, the next-hierarchy quantization method selection unit 011 selects a quantization method for the highest hierarchy in accordance with a hierarchical quantization method and supplies information on the selected quantization method to the feature extraction unit 012 and the quantization index calculation unit 013 (step A1). Next, for the quantization target region as the present object, the feature extraction unit 012 extracts a feature used by the quantization method from an inputted image in accordance with the information on the quantization method supplied by the next-hierarchy quantization method selection unit 011, and supplies the extracted feature to the quantization index calculation unit 013 (step A02). Next, for the quantization target region as the present object, the quantization index calculation unit 013 quantizes the feature supplied by the feature extraction unit 012 in accordance with the information on the quantization method supplied by the next-hierarchy quantization method selection unit 011, and calculates a quantization index (step A03). It is determined whether or not the calculated quantization index is of the lowest hierarchy of the hierarchical quantization method (step A04). In a case that the calculated quantization index is not of the lowest hierarchy, the quantization index calculation unit 013 then supplies (feeds back) the calculated quantization index to the next-hierarchy quantization method selection unit 011, and the next-hierarchy quantization method selection unit 011 selects a quantization method for a lower hierarchy of the supplied (fed-back) quantization index (of the higher hierarchy) and supplies information on the selected quantization method to the feature extraction unit 012 and the quantization index calculation unit 013 (step A05). Then, the operation proceeds to step A02 again. In a case that the calculated quantization index is determined to be of the lowest hierarchy at step A04, it is then determined whether or not processing on all quantization target regions has finished (step A06). In a case that processing on all of the quantization target regions has not finished, a next quantization target region is defined, the operation proceeds to step A01 again, and processing is executed on the next quantization target region. In a case that processing on all of the quantization target regions has finished, the hierarchical quantization index code output unit 014 calculates and outputs a hierarchical quantization index code, which is an encoding allowing unique specification of the quantization indexes of the respective hierarchies of each of the quantization target regions (step A07).

[Effect of First Exemplary Embodiment]

Next, an effect of the first exemplary embodiment of the present invention will be described.

According to the first exemplary embodiment of the present invention, it is possible to extract, from an image, an image feature that makes it possible to adjust the balance between identification capability and robustness, which are the scales of the capability of determining identity of images. The reason is that the capability of determining identity of images varies depending on the hierarchy of a quantization index to be used for comparison among quantization indexes of a plurality of hierarchies calculated for each quantization target region of an image. To be specific, by using a quantization index of a lower hierarchy for comparison, it is possible to increase identification capability, which is the degree of capability of identifying different images, among the capabilities of determining identity of images. On the contrary, by using a quantization index of a higher hierarchy for comparison, it is possible to increase robustness, which is the degree of resistance of a quantization index to various alteration processes on an image, among the capabilities of determining identity of images.

Further, since the image feature extraction device 01 extracts quantization indexes of a plurality of hierarchies calculated based on a hierarchical quantization method as image features, there is an effect that it is possible, when comparing the image features outputted by the image feature extraction devices 01 and calculating an identity scale, to properly select a set of quantization indexes used for comparison, based on the property of the population of images to be compared (a population to which at least one of two images to be compared belongs).

Further, there is an effect that, by properly selecting, based on the property of the population of images to be compared, a set of quantization indexes used for comparison so that the accuracy of determination of identity of images based on a calculated identity scale with respect to the population, it is possible to optimize, for each population the accuracy of determination of identity of images based on the calculated identity scale. Consequently, the accuracy of determination of identity of images based on the calculated identity scale will not extremely decrease depending on the population of images.

Further, since it is possible to use an image feature extracted by the image feature extraction device 01 to properly optimize for a population and calculate an identity scale, it is possible to make a feature extraction method (i.e., a hierarchical quantization method) common without depending on populations. Consequently, there is an effect that it is not necessary to learn an optimum method for extracting a feature (i.e., hierarchical quantization method) for each population. Moreover, consequently, there is no problem even if the population of images to be compared is not defined at the time of extraction of the features of the images.

[Second Exemplary Embodiment]

Figure 1:
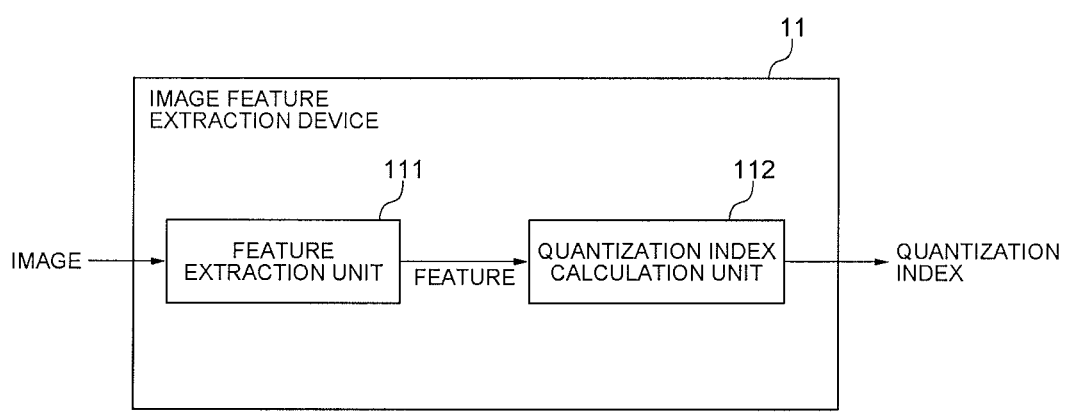
FIG. 1 is a block diagram showing a configuration of an image feature extraction device relating to the present invention.
Figure 2:
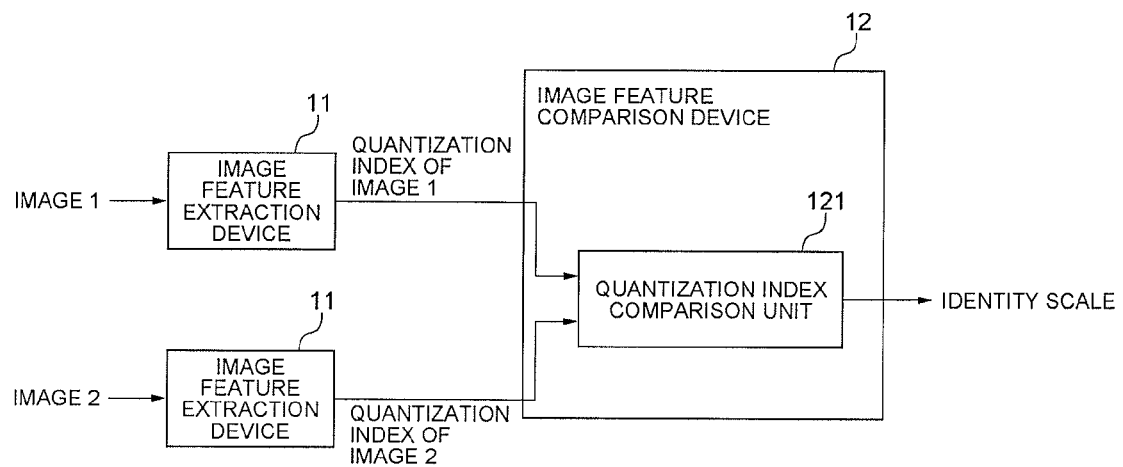
FIG. 2 is a block diagram showing a configuration of an image feature comparison device configured to compare image features extracted by the image feature extraction device relating to the present invention.
Figure 3:
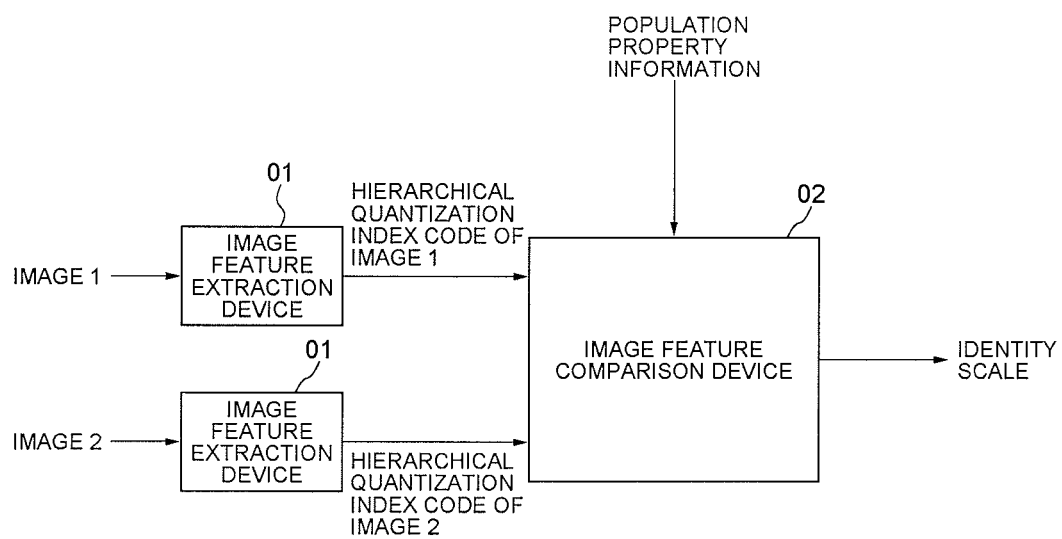
FIG. 3 is a block diagram showing a configuration of a second exemplary embodiment of the present invention.
Figure 5:
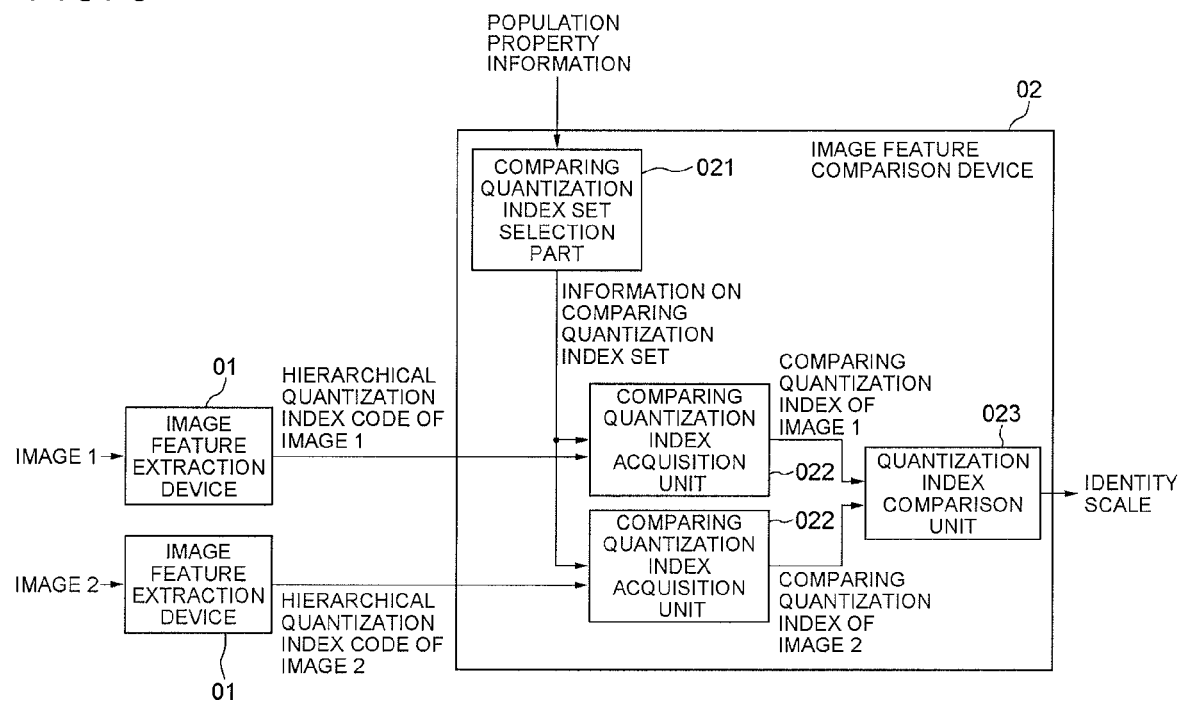
FIG. 5 is a block diagram showing a configuration of an image feature comparison device included in the second exemplary embodiment of the present invention.

Next, a second exemplary embodiment of the present invention will be described in detail with reference to the drawings. FIG. 3 is a block diagram showing a configuration of the second exemplary embodiment. With reference to FIG. 3, the second exemplary embodiment of the present invention includes an image feature extraction device 01 and an image feature comparison device 02. The second exemplary embodiment has a configuration including the image feature comparison device 02 in addition to the image feature extraction device 01 of the first exemplary embodiment of the present invention shown in FIG. 4. The image feature comparison device 02 added herein is configured to compare image features extracted by the image feature extraction devices 01 and output an identity scale representing the degree of identity of images. Such a configuration including the image feature comparison device 02 in addition to the image feature extraction device 01 will be referred to as an image identity scale calculation system. FIG. 5 is a block diagram showing a specific configuration of the image feature comparison device 02 in the image identity scale calculation system of the second exemplary embodiment.

Since the image feature extraction device 01 is identical to the image feature extraction device 01 of the first exemplary embodiment, a description thereof will be omitted.

The image feature comparison device 02 is supplied as inputs with hierarchical quantization index codes of two images calculated by the image feature extraction devices 01, selects a set of quantization indexes used for comparison as a comparing quantization index set based on population property information representing the property of a population to which both or at least one of the two images belongs, compares the hierarchical quantization index codes of the two images by using the comparing quantization index set, and calculates and outputs an identity scale representing the degree of identity of the two images.

A population may be any population as far as both or at least one of two images from which hierarchical quantization index codes are supplied as inputs belongs to the population. A population may be an object to which the image identity scale calculation system of the present invention is applied. Consequently, it is possible to obtain, for a group of images of the population, an effect of the image identity scale calculation system of the present invention. For example, in a case that the image identity scale calculation system of the present invention is applied in order to detect an illegal copy of an image in a certain image-sharing and/or moving-image-sharing service, an object of the application is database of the image-sharing and/or moving-image-sharing service, and therefore, a population may be (a group of images included in) the database of the sharing service.

A population may be a group of images included in a classification to which both or at least one of two images belongs, for example. Here, a classification is a collection of images having any identical property, such as a type based on the contents of the images (e.g., natural images, artifact images, scenery images, portraits, images of flowers, images of animals, and so on). Moreover, particularly in a case that the images are frames of a moving image, a classification may be a genre (e.g., news, sports, variety, drama, documentary, and so on), a broadcast station, a broadcast time, a broadcast program, and so on.

A population may be, for example, a group of images included in database to which both or at least one of two images belongs or in a specific subset thereof. For example, in a case that the image identity scale calculation system of the present invention is applied in a sharing service of images or moving images, a population may be a group of images included in database of images or moving images of the service or in a specific subset thereof. In this case, the image identity scale calculation system of the present invention functions as a system that detects duplication of the same image in the database of the service in a case that both of the two images belong to the database (the population), and functions as a query search of the same image for the database of the service in a case that one of the two images belongs to the database (the population) and the other is supplied from outside. Moreover, for example, in a case that both or at least one of the two images is an image on the Internet, a population may be a group of images on the Internet or a subset thereof Moreover, for example, a population may be a group of images posted on a specific site on the Internet. Moreover, for example, in a case that both or at least one of the two images is an image owned by a specific individual, a population may be a group of images owned by the specific individual or a subset thereof.

Further, for example, in a case that both or at least one of two images is a frame of a moving image, a population may be a group of frames included in a moving image to which both or at least one of the two images belongs or in a partial section of the moving image. For example, in a case that two images are frames that belong to moving image A and moving image B, respectively, a population may be a group of frames included in both or at least one of moving image A (or a partial section of moving image A) and moving image B (or a partial section of moving image B).

A population to which both or at least one of two images from which hierarchical quantization index codes are supplied as inputs belongs does not need to be a collection of images in which the image is included as one image, and can be a collection of images having an identical property. For example, assuming a type based on the content of an image from which a hierarchical quantization index code is supplied as an input is "natural image," in a case that a population is a group of images of "natural image," the group of images of "natural image" as the population does not need to include the image from which the hierarchical quantization index code is supplied as an input. Moreover, for example, in a case that an image from which a hierarchical quantization index code is supplied as an input belongs to certain database, a population may be the whole database including the image, but may be a subset of the database that does not include the image.

Here, population property information is information representing the property of a population, and particularly, information correlated with the accuracy of determination of identity of images based on an identity scale calculated by using a quantization index set having been selected (as a candidate) in a group of images of the population. Based on this information, it is possible to select a comparing quantization index set so that the accuracy of determination of identity of images based on a calculated identity scale becomes high. The accuracy of determination of identity of images based on a calculated identity scale can be regarded as reliability of the identity scale. Therefore, population property information may be regarded as information correlated with the reliability of an identity scale calculated by using a selected quantization index set in images of a population.

Here, the accuracy of determination of identity of images based on an identity scale calculated by using a selected quantization index set depends on two scales: (1) identification capability as the degree of capability of identifying different images, which is owned by the selected quantization index set; and (2) robustness as the degree of resistance of quantization indexes to various alteration processes on image, owned by the selected quantization index set. That is to say, as identification capability is higher as well as robustness is higher, the accuracy of determination of identity of images based on a calculated identity scale becomes higher (identification capability and robustness have a trade-off relation; and generally, robustness becomes lower as identification capability becomes higher, and identification capability becomes lower as robustness becomes higher). Thus, population property information may be information correlated with identification capability as the degree of capability of identifying different images, which is owned by a selected quantization index set, in a group of images of a population. Based on this information, it is possible to select a comparing quantization index set so that identification capability becomes high. Moreover, population property information may be information correlated with robustness of the degree of resistance of a quantization index to various alteration processes on image, which is owned by a selected quantization index set, in a group of images of a population. Based on this information, it is possible to select a comparing quantization index set so that robustness becomes high.

Information correlated with identification capability owned by a selected quantization index set in a group of images of a population may be, for example, the frequency of appearance of each quantization index in the group of images of the population (in this case, the frequency of appearance of each quantization index in the group of images of the population is population property information). This is because, in a case that the numbers of quantization indexes included in quantization index sets are equal, identification capability becomes higher as the appearance frequencies of the respective quantization indexes are more uniform in general. Based on this information, it is possible to select a comparing quantization index set so that the appearance frequencies of respective quantization indexes become as uniform as possible, and make identification capability high. Moreover, population property information is not limited to the appearance frequency of each quantization index in a group of images of a population, and may be, for example, information representing a bias of the appearance frequency toward a specific quantization index in the group of images of the population, or information that indirectly supposes it. This is because, in a case that there is a bias of the appearance frequency toward a specific quantization index (the appearance frequency of the specific quantization index is high) in a selected quantization index set, identification capability becomes low due to the quantization index (this is because a quantization index with high appearance frequency may accidentally appear in common between different images with high probability and it becomes difficult to identify the different images). Population property information may be, for example, information representing "a number of images in a group of images of a population include "sky."" This is because it is possible to presume based on this information that there is a bias of the appearance frequency toward a specific quantization index (in this case, for example, a quantization index representing blue color, specifically) and identification capability becomes lower due to the quantization index. An example in which population property information is the appearance frequency of each quantization index in a group of images of a population will be described in detail in a third exemplary embodiment.

Information correlated with robustness owned by a selected quantization index set in a group of images of a population may be, for example, an alteration resistance degree representing the degree of resistance of a quantization index to various alteration processes on an image of each quantization index in the group of images of the population (in this case, the alteration resistance degree of each quantization index in the group of images of the population is population property information). This is because robustness becomes higher as the alteration resistance degree of each quantization index is higher. Based on this information, it is possible to select a comparing quantization index set so that the alteration resistance degree of a whole quantization index set becomes high, and make robustness high. Moreover, population property information is not limited to the alteration resistance degree of each quantization index in a group of images of a population, and may be, for example, information that can directly or indirectly suppose the alteration resistance degree of a specific quantization index in the group of images of the population. Population property information may be, for example, information representing "a group of images of a population include many grayscale images." This is because it is possible to presume based on this information that the alteration resistance degree of a specific quantization index (in this case, for example, a quantization index calculated by a quantization method using color information, specifically) is low, and robustness becomes low due to the quantization index. An example in which population property information is the alteration resistance degree of each quantization index in a group of images of a population will be described in detail in a fifth exemplary embodiment.

Further, for example, in a case that conversion (e.g., compression of the image, conversion of the image size) is executed on an image when the image is added to a population, and both the image before being added to the population and the image after being added to the population are available, population property information may be information obtained by learning by using the images. For example, in a case that a population is a certain posting site on the Internet, population property information may be information representing the type or degree of alteration, the alteration resistance degree of each quantization index, and so on, which are obtained by comparing an image before being posted and an image after being posted and converted.

With reference to FIG. 5, the image feature comparison device 02 includes a comparing quantization index set selection part 021, a comparing quantization index acquisition unit 022, and a quantization index comparison unit 023.

The comparing quantization index set selection part 021 selects a set of quantization indexes used for comparison as a comparing quantization index set, based on population property information inputted thereinto. The comparing quantization index set selection part 021 supplies information on the selected comparing quantization index set to the comparing quantization index acquisition unit 022.

Here, a condition of selection of a comparing quantization index set selected by the comparing quantization index set selection part 021 will be described. A comparing quantization index set to be selected needs to be such a set of quantization indexes that respective quantization target regions are uniquely classified into the quantization indexes. That is to say, in a case that a certain quantization index in a hierarchical quantization method is selected, a quantization index of a higher hierarchy thereof (an ancestor node) or a quantization index of a lower hierarchy thereof (a descendant node) corresponding to the selected quantization index should not be selected. Moreover, in a case that a plurality of different quantization methods exist in parallel for a lower hierarchy of a certain quantization index (or for the highest hierarchy) in a hierarchical quantization method, quantization indexes calculated by the quantization methods existing in parallel should not be selected at the same time. With reference to FIG. 6, for example, when a comparing quantization index set is selected as {1, 2, 3, 4, 5}, {6, 7, 2, 3, 16, 17, 30, 31, 19, 20, 21}, {22, 23, 7, 8, 9, 26, 27, 3, 16, 17, 30, 36, 37, 19, 20, 21} or {22, 23, 34, 35, 8, 9, 26, 27, 11, 12, 28, 29, 14, 15, 30, 36, 37, 32, 33, 20, 21}, samples are uniquely classified into quantization indexes, which is appropriate. For example, it is impossible to simultaneously select quantization index 24 and quantization index 7 of a quantization index of a higher hierarchy corresponding to quantization index 24, or simultaneously select quantization index 24 and quantization index 1 of a quantization index of a two-hierarchy-higher hierarchy corresponding to quantization index 24. Moreover, for example, it is impossible to simultaneously select quantization index 7 and quantization index 24 or 25 of a quantization index of a lower hierarchy corresponding to quantization index 7, or simultaneously select quantization index 7 and quantization index 34 or 35 of a quantization index of a two-hierarchy-lower hierarchy corresponding to quantization index 7. Moreover, it is desirable that a comparing quantization index set to be selected is such a quantization index set that respective quantization target regions are classified into any quantization indexes so as not to remain unclassified, but not necessarily needed. With reference to FIG. 6, for example, it is desirable to select a comparing quantization index set as {1, 2, 3, 4, 5}, {6, 7, 2, 3, 16, 17, 30, 31, 19, 20, 21}, {22, 23, 7, 8, 9, 26, 27, 3, 16, 17, 30, 36, 37, 19, 20, 21} or {22, 23, 34, 35, 8, 9, 26, 27, 11, 12, 28, 29, 14, 15, 30, 36, 37, 32, 33, 20, 21}, because respective quantization target regions are classified into any quantization indexes so as not to remain unclassified. On the other hand, for example, in a case that a comparing quantization index set is selected as {1, 2, 3, 4}, samples to be classified into quantization index 5 and quantization indexes of lower hierarchies corresponding to quantization index 5 remain unclassified. Such selection is undesirable but possible.

The comparing quantization index set selection part 021 selects a comparing quantization index set based on population property information. For example, in a case that population property information is information correlated with the accuracy of determination of identity of images based on an identity scale calculated by using a selected quantization index set in a group of images of a population, the comparing quantization index set selection part 021 may select a comparing quantization index set based on the information so that the accuracy of determination of identity of images based on the calculated identity scale becomes high. Moreover, for example, in a case that population property information is information correlated with identification capability as the degree of capability of identifying different images, which is owned by a selected quantization index set, the comparing quantization index set selection part 021 may select a comparing quantization index set based on the information so that identification capability becomes high. For making identification capability high, for example, a quantization index of a lower hierarchy may be selected. For example, in a case that population property information is information representing a bias of the appearance frequency toward a specific quantization index in a group of images of a population (information representing high appearance frequency of a specific quantization index) or information capable of indirectly supposing the bias (e.g., information representing "a number of images in the group of images of the population include "sky""), the comparing quantization index set selection part 021, in order to make identification capability high, may select a comparing quantization index set by selecting a quantization index calculated by a quantization method for a lower hierarchy of the specific quantization index (in a case that the population property information is information representing "a number of images in the group of images of the population include "sky,"" a quantization index for a typical sky region, for example, a quantization index representing a color of blue becomes the specific quantization index). (Since a quantization index with high appearance frequency is likely to commonly appear in different images and makes it hard to identify the different images, the quantization index becomes a factor for lowering identification capability. Thus, by selecting a quantization index of a lower hierarchy of the quantization index, it is possible to divide the appearance frequency to suppress the bias of the appearance frequency, and it is possible to increase identification capability.) With reference to FIG. 6, for example, in a case that a quantization index set {1, 2, 3, 4, 5} of the highest hierarchy is firstly assumed to be a candidate and the appearance frequency of quantization index 3 is presumed to be high in a group of images of a population based on population property information, the comparing quantization index set selection part 021, in order to make identification capability high, may select quantization indexes 11 and 12 of quantization indexes calculated by a quantization method for a lower hierarchy of quantization index 3 and set a comparing quantization index set to {1, 2, 11, 12, 4, 5}. A case that population property information is the appearance frequency of each quantization index in a group of images of a population will be described in detail in the third exemplary embodiment. Moreover, for example, in a case that population property information is information correlated with robustness as the degree of resistance of a quantization index to various alteration processes on an image, which is owned by a selected quantization index set in a group of images of a population, the comparing quantization index set selection part 021 may select a comparing quantization index set based on this information so that the robustness becomes high. In order to make robustness high, for example, the comparing quantization index set selection part 021 may select a quantization index of a higher hierarchy. For example, in a case that population property information is information capable of supposing the alteration resistance degree of a specific quantization index in a group of images of a population (e.g., information representing "a number of images in the group of images of the population are grayscale images"), the comparing quantization index set selection part 021, in order to make robustness high, may select a comparing quantization index set by selecting a quantization index of a higher hierarchy corresponding to the specific quantization index (in a case that the population property information is information representing "a number of images in the group of images of the population include grayscale images," a quantization index calculated by a quantization method using color information becomes the specific quantization index). (Since selection of a quantization index of a higher hierarchy integrates a plurality of quantization indexes of one hierarchy and eliminates a change of a quantization index across the plurality of quantization indexes, robustness becomes high.) A case that population property information is the alteration resistance degree of each quantization index in a group of images of a population will be described in detail in a fifth exemplary embodiment.

Further, in a case that information correlated with identification capability and information correlated with robustness owned by a selected quantization index set in a group of images of a population are both inputted as population property information, the comparing quantization index set selection part 021 may select a comparing quantization index set in consideration of both of the information. Since identification capability and robustness have a trade-off relation (in general, robustness decreases when identification capability increases, whereas identification capability decreases when robustness increases), the comparing quantization index set selection part 021, for example, may select a comparing quantization index set so that identification capability and robustness become close to certain standards, respectively, or may select a comparing quantization index set so that one of identification capability and robustness becomes high while the other satisfies a certain standard, or may select a comparing quantization index set based on a scale obtained by quantifying and merging identification capability and robustness.

Further, the comparing quantization index set selection part 021 may select a comparing quantization index set by considering not only population property information but also information independent of a population and correlated with identification capability and/or robustness. Such information is, for example, the number of quantization indexes included in a selected quantization index set (in general, as the number of quantization indexes increases, identification capability increases and robustness decreases), and the depth of hierarchies of a selected quantization index set. For example, the comparing quantization index set selection part 021 may select a comparing quantization index set from among such quantization index sets that the numbers of quantization indexes satisfy a certain reference (e.g., the number of quantization indexes is set to about ten) based on population property information so that identification capability and/or robustness become high.

Further, the comparing quantization index set selection part 021 may select an optimum quantization index set as a comparing quantization index set based on any of the aforementioned references determined by using population property information, from among candidate sets of quantization indexes of all combinations.

Further, the comparing quantization index set selection part 021 may select a comparing quantization index set by, for example, preferentially selecting not a quantization index of a lower hierarchy but a quantization index of a higher hierarchy in a hierarchical quantization method. Moreover, the comparing quantization index set selection part 021 may select a comparing quantization index set by, for example, selecting quantization index sets in the order from the highest hierarchy in a hierarchical quantization method as candidates and, until a quantization index set satisfying a defined standard (e.g., any of the aforementioned standards) based on population property information appears, selecting quantization indexes of lower hierarchies as candidates. For example, in a case that identification capability determined based on population property information does not satisfy a defined standard, the comparing quantization index set selection part 021 may select a comparing quantization index set by selecting quantization indexes of lower hierarchies as candidates. In this case, at the time of selection of quantization indexes of lower hierarchies, the comparing quantization index set selection part 021 may, based on the aforementioned information representing a bias of the appearance frequency toward a specific quantization index in a group of images of a population, select a quantization index calculated by a quantization method for a lower hierarchy of the specific quantization index. With reference to FIG. 6, for example, the comparing quantization index set selection part 021 may firstly select a quantization index set {1, 2, 3, 4, 5} of the highest hierarchy as a candidate and, in a case that identification capability of this set determined based on population property information does not satisfy a defined standard, select a quantization index of a lower hierarchy as a candidate. At this moment, in a case that the appearance frequency of quantization index 3 is presumed to be high in the group of images of the population based on the population property information, the comparing quantization index set selection part 021 may select quantization indexes 11 and 12 of quantization indexes calculated by a quantization method for a lower hierarchy of quantization index 3 and set quantization index set {1, 2, 11, 12, 4, 5} to a candidate. The comparing quantization index set selection part 021 may select a comparing quantization index set by recursively executing such an operation until identification capability determined based on population property information satisfies a defined standard. Moreover, for example, in a case that, when it is determined whether to select a quantization index of a lower hierarchy, robustness determined based on population property information does not satisfy a defined standard, the comparing quantization index set selection part 021 may select a comparing quantization index set so as not to select a quantization index of a lower hierarchy.

A specific example of the comparing quantization index set selection part 021 will be described in detail in the third, fourth, fifth, and sixth exemplary embodiments.

It is desirable that the comparing quantization index set selection part 021 does not execute a process at a time when hierarchical quantization index codes of two images are inputted into the image feature comparison device 02 but previously executes a process on a population to which the identity scale calculation system of the present invention is applied. It is desirable that the comparing quantization index set selection part 021 executes a process only one time on a certain population (it is effective to periodically execute a process when updating a population), and there is no need to execute a process every time hierarchical quantization indexes of two images are newly inputted. Consequently, the image feature comparison device 02 can efficiently and speedily calculate an identity scale in a case that hierarchical quantization index codes of a number of images belonging to the same population are sequentially inputted (i.e., in the case of executing calculation of an identity scale for a number of images belonging to the same population).

The comparing quantization index acquisition unit 022 is supplied as an input with a hierarchical quantization index code of each of two images (image 1 and image 2) calculated by the image feature extraction devices 01, and acquires a quantization index included in a comparing quantization index set represented by information on the comparing quantization index set supplied by the comparing quantization index set selection part 021, from among quantization indexes of respective hierarchies uniquely specified by the hierarchical quantization index code of each quantization target region for each of the images. The comparing quantization index acquisition unit 022 supplies the quantization index of each quantization target region acquired for each of the images to the quantization index comparison unit 023 as a comparing quantization index. In acquisition of a quantization index included in a comparing quantization index set, in a case that a hierarchical quantization index code is obtained by encoding only a quantization index of the lowest hierarchy, the comparing quantization index acquisition unit 022 can obtain a quantization index of a higher hierarchy from the quantization index of the lowest hierarchy in accordance with a hierarchical quantization method, and acquire the quantization index included in the comparing quantization index set from among the quantization indexes of the respective hierarchies. With reference to FIG. 6, for example, it is assumed that a comparing quantization index set is {6, 7, 2, 3, 16, 17, 30, 31, 19, 20, 21}. Then, in a case that a quantization index of the lowest hierarchy of a certain quantization target region is 34 (based on a hierarchical quantization index code), it is possible to obtain quantization indexes 1, 7, 24 and 34 as quantization indexes of respective hierarchies in the order from a higher hierarchy in accordance with a hierarchical quantization method. Since quantization index 7 among these quantization indexes is included in the comparing quantization index set, the comparing quantization index acquisition unit 022 acquires quantization index 7 as a comparing quantization index of the quantization target region. Moreover, in a case that a quantization index of the lowest hierarchy of a certain quantization target region is 27, the comparing quantization index acquisition unit 022 can obtain quantization indexes 2, 10 and 27 as quantization indexes of respective hierarchies in the order from a higher hierarchy in accordance with a hierarchical quantization method. Since quantization index 2 among these quantization indexes is included in the comparing quantization index set, the comparing quantization index acquisition unit 022 acquires quantization index 2 as a comparing quantization index of the quantization target region. Moreover, in a case that a plurality of different quantization methods exist in parallel for a lower hierarchy of a certain quantization index (or for the highest hierarchy) in a hierarchical quantization method and thus a hierarchical quantization index code includes a plurality of hierarchical quantization paths for one quantization target region, the comparing quantization index acquisition unit 022 acquires a quantization index included in a comparing quantization index set from among quantization indexes of respective hierarchies of the respective hierarchical quantization paths. With reference to FIG. 6, for example, it is assumed that a comparing quantization index set is {6, 7, 2, 3, 16, 17, 30, 31, 19, 20, 21}. Here, for example, in a case that there are two quantization indexes, 29 and 17, of the lowest hierarchies of a certain quantization target region (based on a hierarchical quantization index code), it is possible to obtain quantization indexes 4, 13 and 29 in the order from a higher hierarchy as quantization indexes of the respective hierarchies for quantization index 29 and quantization indexes 4 and 17 in the order from a higher hierarchy as quantization indexes of the respective hierarchies for quantization index 17 (quantization index 4 is common). Since quantization index 17 among these quantization indexes is included in the comparing quantization index set, the comparing quantization index acquisition unit 022 acquires quantization index 17 as a comparing quantization index of the quantization target region. In a case that a comparing quantization index set supplied by the comparing quantization index set selection part 021 is a set including an unclassified sample, a quantization target region whose comparing quantization index is unclassified (unfixed) occurs. With reference to FIG. 6, for example, assuming a comparing quantization index set is {1, 2, 3, 4}, in a case that a quantization index of the lowest hierarchy of a certain quantization target region is 32, quantization indexes 5, 19 and 32 of respective hierarchies are obtained in the order from a higher hierarchy in accordance with a hierarchical quantization method, but none of the quantization indexes is included in the comparing quantization index set, so that a comparing quantization index of the quantization target region remains unclassified (unfixed).

It is desirable that, with respect to an image belonging to a population among two images (image 1 and image 2) whose hierarchical quantization index codes are inputted, the comparing quantization index acquisition unit 022 does not acquire a comparing quantization index immediately before calculation of an identity scale but previously acquires a comparing quantization index after information of a comparing quantization index set is prepared. That is to say, it is desirable to previously acquire a comparing quantization index, with respect to a group of images of a population. Consequently, the image feature comparison device 02 can efficiently and speedily calculate an identify scale. Moreover, consequently, the need for acquiring a comparing quantization index every time calculating an identity scale repeatedly for the same image is eliminated. For example, in a case that certain database is a population, one of two images belongs to the database and the other image is supplied from outside as a query, previous acquisition of a comparing quantization index for the image belonging to the database eliminates the need for acquiring a comparing quantization index every time a query is supplied from outside, so that it is possible to speedily calculate an identity scale. Moreover, for example, in a case that certain database is a population, both of two images belong to the database and calculation of an identity scale is executed on all of the image pairs within the database, previous acquisition of a comparing quantization index for all of the images belonging to the database eliminates the need for acquiring a comparing quantization index every time an identity scale for each image pair is calculated, so that it is possible to largely increase the speed of calculation of an identity scale.

The quantization index comparison unit 023 compares, for each corresponding quantization target region, comparing quantization indexes of two images (image 1 and image 2) supplied by the comparing quantization index acquisition unit 022, calculates an identity scale representing the degree of identity of the two images based on the number of quantization target region whose quantization indexes coincide, and outputs the identity scale. An identity scale may be the number of quantization target regions whose quantization indexes coincide, for example. Moreover, for example, an identity scale may be calculated based on the number of quantization target regions whose quantization indexes do not coincide (a Hamming distance). Moreover, for example, an identity scale may be a value obtained by obtaining the number of quantization target regions whose quantization indexes coincide for each quantization index, making a weight value previously defined for each quantization index act thereon, and adding. Moreover, for example, an identity scale may be a value obtained by quantifying whether or not quantization indexes coincide for each quantization target region (e.g., the value is 1 when coincide, and the value is 0 when not coincide), making a weight value previously defined for each quantization target region act thereon (e.g., in a case that a quantization target region is a local region of an image, the weight value of the local region closer to the center of the image is larger), and adding. At the time of comparison for each corresponding quantization target region, in a case that both or at least one of comparing quantization indexes of two images is unclassified (unfixed), the quantization target region may be made not to contribute to calculation of an identity scale.

It is desirable that the hierarchical quantization method, the population property information, and the comparing quantization index set selected by the comparing quantization index set selection part 021, which have been described above, are common to all quantization target regions, but they may vary for each quantization target region or for each group of quantization target regions (a case that quantization target regions are a plurality of local regions of an image, e.g., in the image, a group of local regions belonging to an upper left region, a group of local regions belonging to an upper right region, a group of local regions belonging to a lower left region, and a group of local regions belonging to a lower right region). That is to say, for example, a hierarchical quantization method may vary for each quantization target region or for each group of quantization target regions. Moreover, for example, population property information supplied as an input may vary for each quantization target region or for each group of quantization target regions. Moreover, for example, a comparing quantization index set selected by the comparing quantization index set selection part 021 may vary for each quantization target region or for each group of quantization target regions. Thus, by varying a hierarchical quantization method, population property information, or a comparing quantization index set selected by the comparing quantization index set selection part 021 for each quantization target region or for each group of quantization target regions, it is possible to optimize so as to fit to a feature of each quantization target region or each group of quantization target region. For example, in a case that quantization target regions are a plurality of local regions of an image, assuming it is highly possible that a central region of the image is a foreground object and a peripheral region of the image is a background, by utilizing this feature, a hierarchical quantization method composed of quantization methods appropriate for describing a foreground object (e.g., a quantization method using edge information as a feature) may be used for the local region belonging to the central region of the image, and a hierarchical quantization method composed of a quantization method appropriate for describing a background (e.g., a quantization method using color information as a feature) may be used for the local region belonging to the peripheral region of the image.

[Description of Operation]

Figure 8:
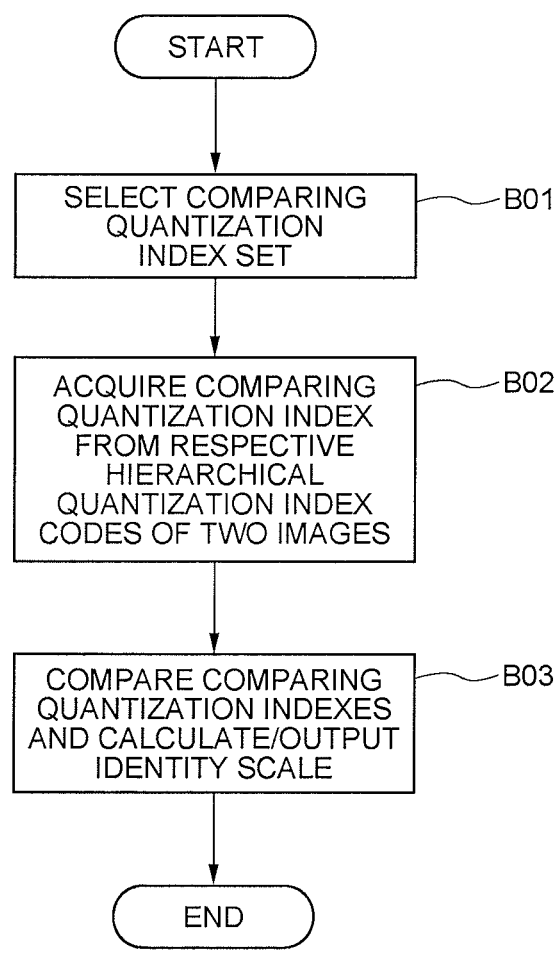
FIG. 8 is a flowchart showing an operation of the image feature comparison device included in the second exemplary embodiment of the present invention.

Next, an operation of the second exemplary embodiment will be described by using a flowchart of FIG. 8.

Since an operation of the image feature extraction device 01 in the second exemplary embodiment is identical to an operation of the image feature extraction device 01 in the first exemplary embodiment, a description thereof will be omitted here.

Next, an operation of the image feature comparison device 02 in the second exemplary embodiment will be described. FIG. 8 is a flowchart showing the operation of the image feature comparison device 02 in the second exemplary embodiment.

First, the comparing quantization index set selection part 021 selects a comparing quantization index set based on inputted population property information, and supplies information on the selected comparing quantization index set to the comparing quantization index acquisition unit 022 (step B01). It is desirable to not execute step B01 at a time that hierarchical quantization index codes of two images are inputted into the image feature comparison device 02 but previously execute step B01 on a population to which the identity scale calculation system of the present invention is applied. Next, from the respective inputted hierarchical quantization index codes of the two images, the comparing quantization index acquisition unit 022 acquires comparing quantization indexes for the respective images based on the information on the comparing quantization index set supplied by the comparing quantization index set selection part 021, and supplies the acquired comparing quantization indexes to the quantization index comparison unit 023 (step B02). Next, the quantization index comparison unit 023 compares the comparing quantization indexes of the two images supplied by the comparing quantization index acquisition unit 022, and calculates and outputs an identity scale (step B03).

[Effect of Second Exemplary Embodiment]

Next, an effect of the second exemplary embodiment of the present invention will be described.

In the second exemplary embodiment of the present invention, there is an effect that, with quantization indexes of a plurality of hierarchies calculated based on a hierarchical quantization method as features, the image feature comparison device 02 selects a quantization index set used for comparison based on property information of a population to which both or at least one of the two images for calculating an identity scale belongs, and calculates an identity sale based thereon, whereby it is possible to optimize properly to a population of images to be compared.

Further, there is an effect that, assuming population property information is information correlated with the accuracy of determination of identity of images based on an identity scale calculated by using the selected quantization index set, by selecting a comparing quantization index set so that the accuracy of determination of identity of images based on a calculated identity scale becomes high based on the information, it is possible to optimize the accuracy of determination of identity of images based on the calculated identity scale for each population. Consequently, the accuracy of determination of identity of images based on a calculated identity scale does not extremely decrease due to population of an image.

Further, by using a feature extracted by the image feature extraction device 01, the image feature comparison device 02 optimizes so as to fit to a population and calculates an identity scale, whereby it is possible to make a feature extraction method (i.e., a hierarchical quantization method) common and independent of the population. Thus, there is an effect that it is not necessary to learn an optimum feature extraction method (i.e., hierarchical quantization method) for each population. Moreover, no problem occurs consequently even if a population as an object for comparison of images is not defined at the time of extraction of features of the images.

[Third Exemplary Embodiment]

Figure 9:
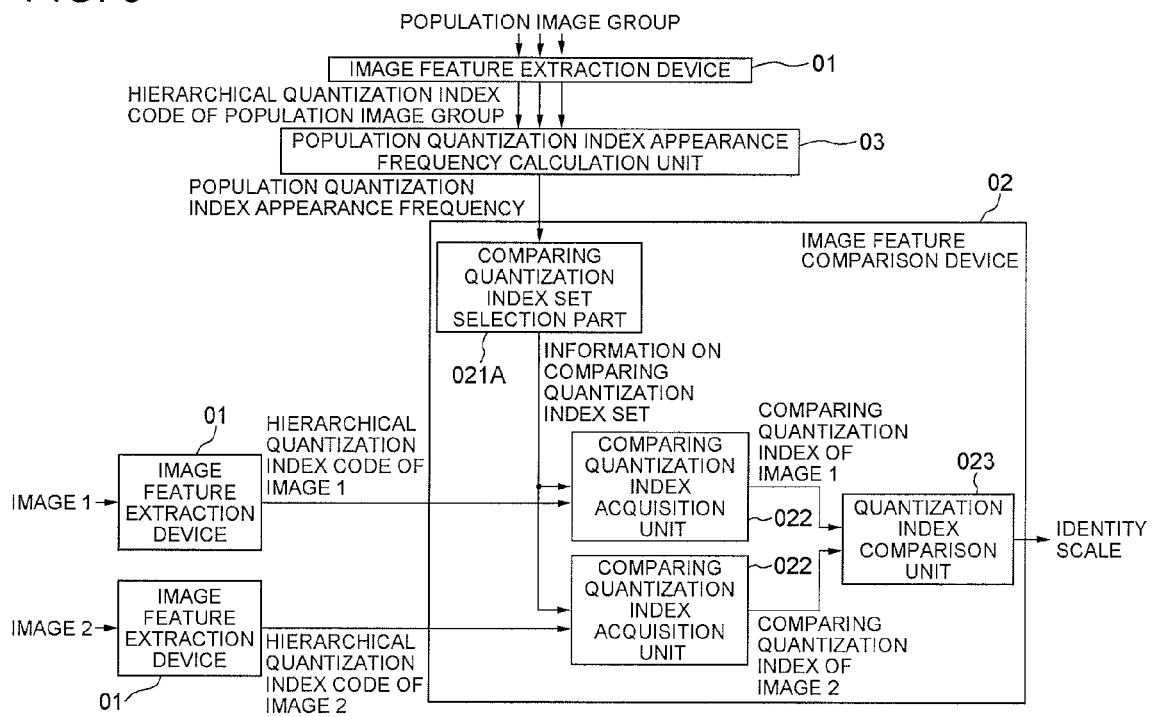
FIG. 9 is a block diagram showing a configuration of a third exemplary embodiment of the present invention.

Next, a third exemplary embodiment of the present invention will be described in detail with reference to the drawings. The third exemplary embodiment more specifically embodies population property information to be inputted and the comparing quantization index set selection part 021 in the image feature comparison device 02 of the second exemplary embodiment. An image feature extraction device in the third exemplary embodiment is the same as the image feature extraction device 01 of the first exemplary embodiment shown in FIG. 4. FIG. 9 is a block diagram showing a configuration of an image feature comparison device of an image identity scale calculation system in the third exemplary embodiment. With reference to FIG. 9, the third exemplary embodiment of the present invention is different from the configuration of the second exemplary embodiment shown in FIGS. 4 and 5 in that a population quantization index appearance frequency calculation unit 03 is added and moreover a comparing quantization index set selection part 021A is placed instead of the comparing quantization index set selection part 021. Since other points are the same as in the second exemplary embodiment, the different points from the second exemplary embodiment will be described.

The population quantization index appearance frequency calculation unit 03 is supplied as an input with a hierarchical quantization index code of a group of images of a population calculated by the image feature extraction device 01, calculates the appearance frequency of each quantization index of a hierarchical quantization method in the group of images of the population, and supplies the calculated appearance frequency of each quantization index in the population as population quantization index appearance frequency to the comparing quantization index set selection part 021A. Here, the group of images of the population may be all of the images included in the population and, if reflecting the feature of the population, may be only a group of images extracted by properly sampling. The population quantization index appearance frequency calculation unit 03 calculates the appearance frequency for all of the quantization indexes of the hierarchical quantization method from quantization indexes of the respective hierarchies uniquely specified by the respective hierarchical quantization index codes of the group of images of the population having been inputted. With reference to FIG. 6, the population quantization index appearance frequency calculation unit 03 calculates the appearance frequency for all of the quantization indexes 1 to 37. In a case that the hierarchical quantization index code is obtained by encoding the quantization index of the lowest hierarchy, the population quantization index appearance frequency calculation unit 03 obtains a quantization index of a higher hierarchy from the quantization index of the lowest hierarchy in accordance with the hierarchical quantization method, and adds to calculation of the appearance frequency. With reference to FIG. 6, for example, in a case that the quantization index of the lowest hierarchy of a certain quantization target region of a certain image is quantization index 34 based on a hierarchical quantization index code of a group of images of a population, the appearance frequency of each of the quantization indexes 1, 7, 24 and 34 is increased by one. Therefore, the appearance frequency of the certain quantization index is the sum of the appearance frequencies of all the quantization indexes of one-lower hierarchies. For example, the appearance frequency of quantization index 24 is the sum of the appearance frequencies of quantization indexes 34 and 35, the appearance frequency of quantization index 7 is the sum of the appearance frequencies of quantization indexes 24 and 25, and the appearance frequency of quantization index 1 is the sum of the appearance frequencies of quantization indexes 6 and 7.

The appearance frequency of each quantization index outputted by the population quantization index appearance frequency calculation unit 03 does not need to be exactly the frequency of appearance but may be, for example, the probability of appearance. The probability of appearance of each quantization index is a value obtained by dividing the appearance frequency of each quantization index calculated by the abovementioned method, by the number of all of the quantization target regions.

The comparing quantization index set selection part 021A selects a comparing quantization index set so that the appearance frequencies of the quantization indexes become as uniform as possible based on the population quantization index appearance frequency supplied by the population quantization index appearance frequency calculation unit 03. The comparing quantization index set selection part 021A supplies information on the selected comparing quantization index set to the comparing quantization index acquisition unit 022. The comparing quantization index set selection part 021A is one embodiment of the comparing quantization index set selection part 021 of the second exemplary embodiment, into which population quantization index appearance frequency is specifically inputted as population property information. The conditions and so on relating to selection of a comparing quantization index set conform to those described in the second embodiment.

The comparing quantization index set selection part 021A selects a comparing quantization index so that the appearance frequencies of quantization indexes become as uniform as possible, thereby making identification capability of the degree of capability of identifying difference images high. This is because, in a case that the numbers of quantization indexes included in quantization index sets are the same, when there is a bias toward a specific quantization index (i.e., the appearance frequency of a specific quantization index is higher), the probability that the quantization index with high appearance frequency incidentally appears in common between difference images becomes high and identification capability lowers.

As a method for selecting a comparing quantization index so that the appearance frequencies of quantization indexes become as uniform as possible based on population quantization index appearance frequency, the comparing quantization index set selection part 021A may calculate an appearance frequency uniformity degree representing the degree of uniformity of the appearance frequencies of quantization indexes in a quantization index set selected as a candidate, and select such a quantization index set that the appearance frequency uniformity degree becomes high as a comparing quantization index set based on the appearance frequency uniformity degree. For example, the comparing quantization index set selection part 021A may calculate an appearance frequency uniformity degree of each quantization index set of all combinations as candidates, and select such a quantization index set that the appearance frequency uniformity degree is the maximum as a comparing quantization index set.

For example, the appearance frequency uniformity degree may be calculated based on variance of the appearance frequency (or the appearance probability) of a quantization index. For example, assuming set of quantization index sets selected as candidates is denoted by S, the number of quantization indexes included in the quantization index sets selected as candidates (i.e., the element count of the set) is denoted by N, a certain quantization index is denoted by i, and the appearance frequency of quantization index i is denoted by $F_i$, variance V of the appearance frequency of a quantization index can be calculated by the following equation. $F_a$ denotes the average value of the appearance frequency.

$$V = 1/N\{\Sigma_{j \in S}(F_a - F_i)^2\} \quad \text{(Equation 1)}$$

Here, as variance V of the appearance frequency of the quantization index calculated by Equation 1 is smaller, the appearance frequency uniformity degree is higher. Therefore, any calculation method may be employed as far as a higher appearance frequency uniformity degree is obtained as variance V of the appearance frequency is smaller (i.e., a method of calculating based on a monotonically decreasing function with respect to variance V of the appearance frequency). For example, the appearance frequency uniformity degree may be calculated as a reciprocal of variance V of the appearance frequency.

Further, the appearance frequency uniformity degree may be calculated based on, for example, population quantization index appearance frequency, the number of quantization indexes that the difference between the appearance frequency (or the appearance probability) of a quantization index and the average value of the appearance frequency (or the average value of the appearance probability) of the quantization index is equal to or less than a certain defined value (i.e., the number of quantization indexes far from the average value), or the ratio thereof. In this case, the more the number of quantization indexes with a defined value or less is, the higher the appearance frequency uniformity degree is. Here, the appearance frequency uniformity degree may be calculated by any calculation method as far as the appearance frequency uniformity degree is higher as the number of quantization indexes with a defined value or less is more (i.e., any method of calculating based on a monotonically increasing function with respect to this number). For example, the number of quantization indexes with a defined value or less may be used as the appearance frequency uniformity degree.

Further, an appearance frequency uniformity degree may be calculated based on, for example, information entropy (entropy) calculated based on population quantization index appearance frequency. For example, when the appearance probability of quantization index i is denoted by $P_i$, information entropy H can be calculated by the following equation.

$$H = -\Sigma_{j \in S} P_i \log(P_i) \quad \text{(Equation 2)}$$

As information entropy H calculated by Equation 2 is larger, the appearance frequency uniformity degree is higher. The appearance frequency uniformity degree may be calculated by any method as far as an appearance frequency uniformity degree is calculated so as to be higher as information entropy H is larger (i.e., may be calculated by any method based on a monotonically increasing function with respect to information entropy H). For example, information entropy H may be the appearance frequency uniformity degree.

These methods are examples of calculation of an appearance frequency uniformity degree, and a method for calculating an appearance frequency uniformity degree may be any method of calculating a scale representing the degree of uniformity of the appearance frequencies of quantization indexes.

Further, the comparing quantization index set selection part 021A may select a comparing quantization index set in consideration of, in addition to the aforementioned appearance frequency uniformity degree, for example, the number of quantization indexes included in a quantization index set selected as a candidate (or the depth of hierarchies of a selected quantization index set). This is because, as the number of quantization indexes of a quantization index set (or the depth of hierarchies), which is information independent of the uniformity degree of the appearance frequencies of quantization indexes as well as information independent of a population, increases, identification capability of the degree of capability of identifying different images increases but robustness of the degree of resistance of a quantization index to various alteration processes on an image decreases, and because there is a case that it is preferable to select a comparing quantization index set in consideration of both the uniformity degree of appearance frequencies of quantization indexes and the number of quantization indexes (or the depth of hierarchies). For example, from the viewpoint of identification capability and robustness, an appropriate range of the number of quantization indexes may be set in advance (e.g., the number of quantization indexes is set to about ten) to select a set whose appearance frequency uniformity degree calculated by the aforementioned method for calculating an appearance frequency uniformity degree is high, as a comparing quantization index set, from among quantization index sets satisfying the condition.

Further, the comparing quantization index set selection part 021A may select a comparing quantization index set in consideration of, in addition to the aforementioned appearance frequency uniformity degree, for example, the alteration resistance degree representing the degree of resistance of a quantization index to various alteration processes on an image. The alteration resistance degree of each quantization index can be obtained by, for example, previously executing various alteration processes on a group of images for learning to generate copy images, calculating hierarchical quantization index codes from the original images and the copy images by using the image feature extraction device 01, and measuring a ratio of coincidence of quantization indexes in corresponding quantization target regions, for each quantization index. For example, the comparing quantization index set selection part 021A may select, as a comparing quantization index set, such a quantization index set that an appearance frequency uniformity degree is high and the alteration resistance degree of the whole quantization index set calculated from the alteration resistance degree of each quantization index (e.g., the average value of the alteration resistance degree of each quantization index) is large. Moreover, for example, the comparing quantization index set selection part 021A may select a comparing quantization index set so as not to include such a quantization index that an appearance frequency uniformity degree is high and the alteration resistance degree of each quantization index is low. An example of using the alteration resistance degree of each quantization index as population property information in a group of images of a population will be described in detail in a fifth exemplary embodiment.

Further, for selecting a comparing quantization index so that the appearance frequencies of quantization indexes are as uniform as possible based on population quantization index appearance frequency, the comparing quantization index set selection part 021A may be configured to, for example, in a case that the appearance frequency of a specific quantization index in a certain quantization index set selected as a candidate is high (the appearance frequency is biased toward the specific quantization index), select a quantization index of a lower hierarchy with respect to the quantization index. With reference to FIG. 6, for example, in a case that quantization index set {1, 2, 3, 4, 5} of the highest hierarchy is firstly a candidate and the appearance frequency of quantization index 3 is higher than the appearance frequencies of the other quantization indexes based on a population quantization index appearance frequency, quantization indexes 11 and 12 calculated by a quantization method for a lower hierarchy of quantization index 3 may be selected to set a comparing quantization index set to {1, 2, 11, 12, 4, 5}.

<Configuration Example 1 of Comparing Quantization Index Set Selection Part 021A>

Further, the comparing quantization index set selection part 021A may select a comparing quantization index set by selecting a quantization index set of a lower hierarchy of a quantization index with high appearance frequency (replacing the quantization index with the quantization index set of the lower hierarchy thereof), based on population quantization index appearance frequency supplied by the population quantization index appearance frequency calculation unit 03, in the order from a quantization index set of the highest hierarchy of the hierarchical quantization method, until a defined condition is satisfied. Here, the defined condition may be, for example, whether the appearance frequency uniformity degree of a quantization index set, the number of quantization indexes included in a quantization index set (or the depth of hierarchies), the alteration resistance degree of a whole set, which are described above, or a combination thereof is within a previously defined value range or not. Moreover, the defined condition may be, for example, based on the appearance frequency uniformity degree of a quantization index set, the number of quantization indexes included in a quantization index set (or the depth of hierarchies), the alteration resistance degree of a whole set, the appearance frequency of each quantization index, the alteration resistance degree of each quantization index, which are described above, or a combination thereof. For example, a comparing quantization index set may be selected by setting the minimum value of the appearance frequency uniformity degree, and selecting a quantization index set of a lower hierarchy of a quantization index with high appearance frequency in the order from a quantization index set of the highest hierarchy until a quantization index set exceeding the minimum value of the appearance frequency quality degree appears. Moreover, for example, a comparing quantization index set may be selected by setting the minimum value of the number of quantization indexes, and selecting a quantization index set of a lower hierarchy of a quantization index with high appearance frequency in the order from a quantization index set of the highest hierarchy until a quantization index set exceeding the minimum value of the number of quantization indexes appears. Moreover, for example, a comparing quantization index set may be selected by setting both the minimum value of the appearance frequency uniformity degree and the minimum value of the number of quantization indexes, and selecting a quantization index set of a lower hierarchy of a quantization index with high appearance frequency in the order from a quantization index set of the highest hierarchy until a quantization index set exceeding the minimum values appears. Moreover, a quantization index with high appearance frequency may be, for example, a quantization index with the highest appearance frequency among quantization index sets of present candidates. For example, in a case that, at a stage that a quantization index set of a present candidate does not satisfy a defined condition, a quantization index with the highest appearance frequency in the quantization index set is a quantization index of the lowest hierarchy, a quantization index set of a lower hierarchy of a quantization index with second highest appearance frequency may be selected. Moreover, a plurality of quantization indexes with high appearance frequencies in a quantization index set of a present candidate (e.g., all quantization indexes with appearance frequencies exceeding a certain threshold value) may be selected. Moreover, in a case that a plurality of quantization index sets calculated by a plurality of different quantization methods exist in a lower hierarchy of a quantization index with high appearance frequency, any of the sets is selected (with reference to FIG. 6, for example, assuming a quantization index with high appearance frequency is quantization index 4, either a set of quantization indexes 13, 14 and 15 or a set of quantization indexes 16 and 17 can be selected as a quantization index of a lower hierarchy thereof). Which to select may be determined based on, for example, the appearance frequency uniformity degree of a quantization index set, the number of quantization indexes included in a quantization index set (or the depth of hierarchies), the alteration resistance degree of a whole set, which are described above, or a combination thereof For example, such a set may be selected that becomes optimum based on the appearance frequency uniformity degree of a quantization index set, the number of quantization indexes included in a quantization index set (or the depth of hierarchies), or the alteration resistance degree of a whose set in the case of replacing with a quantization index set calculated by the respective quantization methods and generating a candidate quantization index set.

For example, a case that a defined condition is "the number of quantization indexes is ten or more" will be described with reference to FIG. 6. Here, a method of selecting a quantization index set of a lower hierarchy of a quantization index with the highest appearance frequency in a candidate quantization index set will be described. Firstly, a quantization index set {1, 2, 3, 4, 5} of the highest hierarchy is selected as a candidate. Since the number of the selected quantization indexes is five, the defined condition is not satisfied. Here, assuming a quantization index with the highest appearance frequency is quantization index 2, quantization indexes 8, 9 and 10 as quantization indexes of a lower hierarchy of quantization index 2 are then selected, and quantization index set {1, 8, 9, 3, 4, 5} is selected as a next candidate. Since the number of the selected quantization indexes is seven, the defined condition is not satisfied. Here, assuming a quantization index with the highest appearance frequency is quantization index 3, quantization indexes 11 and 12 as quantization indexes of a lower hierarchy of quantization index 3 are then selected, and quantization index set {1, 8, 9, 10, 11, 12, 4, 5} is selected as a next candidate. Since the number of the selected quantization indexes is eight, the defined condition is not satisfied. Here, assuming a quantization index with the highest appearance frequency is quantization index 10, quantization indexes 26 and 27 as quantization indexes of a lower hierarchy of quantization index 10 are then selected, and quantization index set {1, 8, 9, 26, 27, 11, 12, 4, 5} is selected as a next candidate. Since the number of the selected quantization indexes is nine, the defined condition is not satisfied. Here, assuming a quantization index with the highest appearance frequency is quantization index 4, a quantization index set of a lower hierarchy of quantization index 4 is then selected. As quantization indexes of a lower hierarchy of quantization index 4, either a set of quantization indexes 13, 14 and 15 or a set of quantization indexes 16 and 17 can be selected. Which to select may be determined based on, for example, the appearance frequency uniformity degree of a quantization index set, the number of quantization indexes (or the depth of hierarchies), the alteration resistance degree of a whole set, which are described above, or a combination thereof Here, for example, the set of quantization indexes 16 and 17 is selected, and quantization index set {1, 8, 9, 26, 27, 11, 12, 16, 17, 5} is selected as a next candidate. Since the number of the selected quantization indexes is ten, the defined condition is satisfied. Accordingly, the selected quantization index set {1, 8, 9, 26, 27, 11, 12, 16, 17, 5} is determined as a comparing quantization index set.

Figure 10:
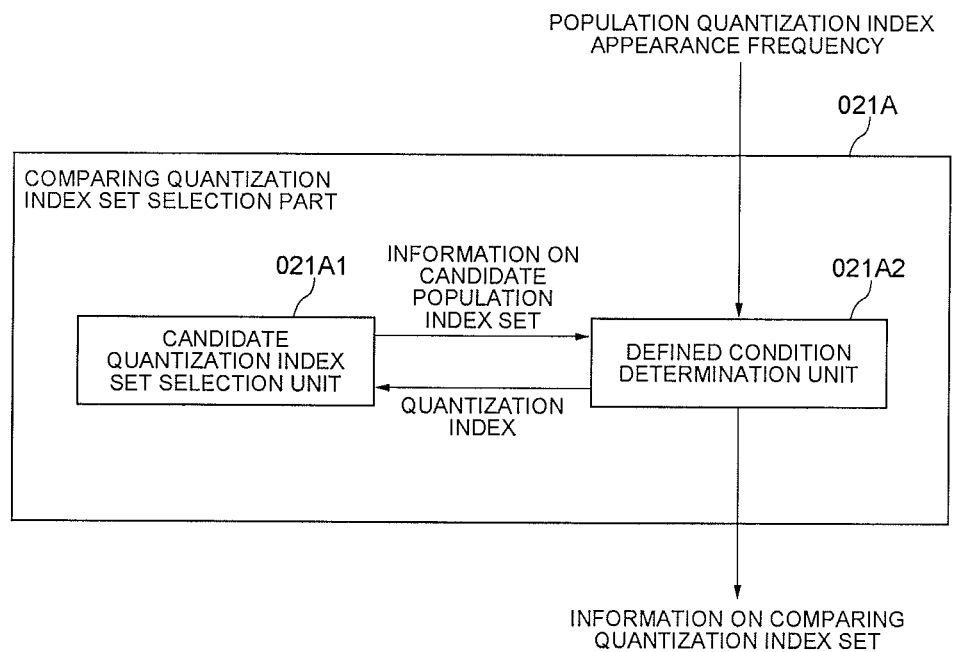
FIG. 10 is a block diagram showing a configuration example of a comparing quantization index set selection part included in the third exemplary embodiment of the present invention.

FIG. 10 shows a configuration example of the comparing quantization index set selection part 021A in a case that a method of selecting a quantization index set of a lower hierarchy in the order from a quantization index set of the highest hierarchy of the hierarchical quantization method is employed (the configuration example 1). With reference to FIG. 10, the configuration example 1 of the comparing quantization index set selection part 021A includes a candidate quantization index set selection unit 021A1 and a defined condition determination unit 021A2.

The candidate quantization index set selection unit 021A1, in a case that a quantization index (of a higher hierarchy) is not supplied, selects a quantization index set of the highest hierarchy as a candidate quantization index set and, in a case that a quantization index is supplied, replaces the quantization index with a quantization index set of a lower hierarchy thereof and selects as a candidate quantization index set, in accordance with the hierarchical quantization method. The candidate quantization index set selection unit 021A1 supplies information on the selected candidate quantization index set to the defined condition determination unit 021A2. A quantization index inputted into the candidate quantization index set selection unit 021A1 is information fed back from the defined condition determination unit 021A2.

The defined condition determination unit 021A2 determines whether or not the candidate quantization index set represented by the information on the candidate quantization index set supplied by the candidate quantization index set selection unit 021A1 satisfies a defined condition having been defined in advance. In a case that the defined condition is satisfied, the defined condition determination unit 021A2 outputs the candidate quantization index set as a comparing quantization index set. In a case that the defined condition is not satisfied, the defined condition determination unit 021A2 obtains a quantization index with high appearance frequency in the candidate quantization index set based on population quantization index appearance frequency supplied by the population quantization index appearance frequency calculation unit 03, and supplies (feeds back) the obtained quantization index to the candidate quantization index set selection unit 021A1. Here, the defined condition is as described above.

The configuration example 1 of the comparing quantization index set selection part 021A describes a case of selecting a quantization index "with high appearance frequency" in a present candidate quantization index set, as a reference for selecting a quantization index to be replaced with a quantization index set of a lower hierarchy, in a method of selecting a quantization index set of a lower hierarchy in the order from a quantization index set of the highest hierarchy of the hierarchical quantization method based on population quantization index appearance frequency. Another method other than the method of selecting a quantization index "with high appearance frequency" will be described below.

For example, such a quantization index that the appearance frequency uniformity degree of a candidate quantization index set to be newly generated becomes high (e.g., becomes the maximum) by replacing with a quantization index set of a lower hierarchy in a present candidate quantization index set may be selected as a quantization index to be replaced with a quantization index set of a lower hierarchy. With reference to FIG. 6, for example, in a case that a present candidate quantization index set is {1, 2, 3, 4, 5}, and the appearance frequency uniformity degree of set {1, 2, 11, 12, 4, 5} generated by replacing quantization index 3 with a quantization index set of a lower hierarchy is the highest among set {6, 7, 2, 3, 4, 5} generated by replacing quantization index 1 with a quantization index set of a lower hierarchy, set {1, 8, 9, 10, 3, 4, 5} generated by replacing quantization index 2 with a quantization index set of a lower hierarchy, set {1, 2, 11, 12, 4, 5} generated by replacing quantization index 3 with a quantization index set of a lower hierarchy, set {1, 2, 3, 13, 14, 15, 5} or set {1, 2, 3, 16, 17, 5} generated by replacing quantization index 4 with a quantization index set of a lower hierarchy, and set {1, 2, 3, 4, 18, 19, 20, 21} generated by replacing quantization index 5 with a quantization index set of a lower hierarchy, quantization index 3 may be selected as a quantization index replaced with a quantization index set of a lower hierarchy, and set {1, 2, 11, 12, 4, 5} may be set as a new candidate quantization index set. Moreover, at the time of selection, the number of quantization indexes included in a newly generated candidate quantization index set may be considered.

Further, for example, a quantization index to be replaced with a quantization index set of a lower hierarchy may be selected from a present candidate quantization index set based on the appearance frequency of a quantization index of a lower hierarchy of each quantization index. For example, for each quantization index, the appearance frequency uniformity degree of a quantization index set of a lower hierarchy of the quantization index may be calculated, and a quantization index whose lower hierarchy has a set with the largest appearance frequency uniformity degree may be selected. With reference to FIG. 6, for example, in a case that a present candidate quantization index set is {1, 2, 3, 4, 5}, and the appearance frequency uniformity degree of quantization index set {11, 12} of a lower hierarchy of quantization index 3 is the largest among quantization index sets {6, 7}, {8, 9, 10}, {11, 12}, {13, 14, 15} or {16, 17}, and {18, 19, 20, 21} of lower hierarchies of the respective quantization indexes, quantization index 3 may be selected as a quantization index to be replaced with a quantization index set of a lower hierarchy, and set {1, 2, 11, 12, 4, 5} may be selected as a new candidate quantization index set. Moreover, at the time of selection, the number of quantization indexes of a quantization index set of a lower hierarchy may be considered.

Further, for example, in a case that a quantization index to be replaced with a set of quantization indexes of a lower hierarchy is selected, in addition to the appearance frequency of each of the quantization indexes, (a) the number of quantization indexes of a lower hierarchy of each of the quantization indexes, (b) the alteration resistance degree of each of the quantization indexes, and (c) the alteration resistance degree of a quantization index of a lower hierarchy of each of the quantization indexes may be considered. With reference to FIG. 6, example (a) will be described. For example, in a case that a present candidate quantization index set is {1, 2, 3, 4, 5} and the appearance frequencies of quantization indexes 3 and 5 are high, the numbers (two and four) of quantization indexes of lower hierarchies thereof are compared, and quantization index 5 with a larger number of quantization indexes may be selected as a quantization index to be replaced with a quantization index set of a lower hierarchy. On the contrary, quantization index 3 with a smaller number of quantization indexes may be selected as a quantization index to be replaced with a quantization index set of a lower hierarchy. With reference to FIG. 6, example (a) will be described. For example, in a case that a present candidate quantization index set is {1, 2, 3, 4, 5}, the appearance frequencies of quantization indexes 3 and 5 are high, and the alteration resistance degree of quantization index 3 is higher than that of quantization index 5, quantization index 3 may be selected as a quantization index to be replaced with a quantization index set of a lower hierarchy. Since it is thus possible to preferentially divide a quantization index with higher alteration resistance degree, it is possible to increase robustness of a quantization index set newly selected as a candidate against various alteration processes. With reference to FIG. 6, example (c) will be described. For example, in a case that a present candidate quantization index set is {1, 2, 3, 4, 5}, and the appearance frequencies of quantization indexes 3 and 5 are high, with respect to quantization index set {11, 12} and quantization index set {18, 19, 20, 21} of lower hierarchies of quantization index 3 and quantization index 5, the alteration resistance degree of the whole set (e.g., the average value of the alteration resistance degrees of the respective quantization indexes) may be obtained, and either quantization index 3 or 5 having a larger value may be selected as a quantization index to be replaced with a lower quantization index set.

Accordingly, there are various methods for selecting a quantization index to be replaced with a set of quantization indexes of a lower hierarchy based on population quantization index appearance frequency, and any method may be used. Moreover, any method for selecting a quantization index to be replaced with a quantization index set based on the population quantization index, regardless of the above configuration.

[Description of Operation of Third Exemplary Embodiment]

Next, an operation of the comparing quantization index set selection part 021A specifically having the configuration example 1 in the third exemplary embodiment will be described.

Figure 11:
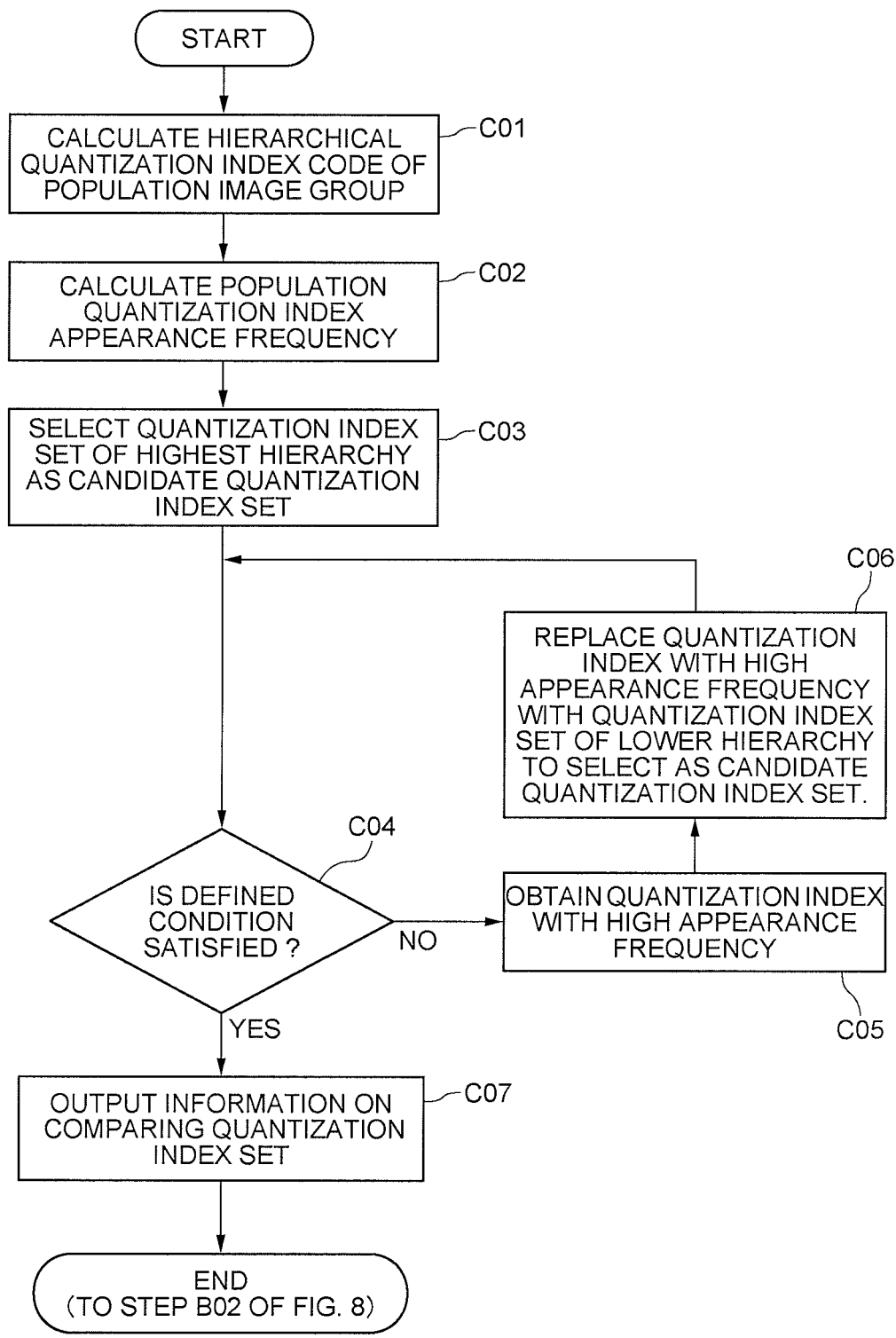
FIG. 11 is a flowchart showing an operation of the third exemplary embodiment of the present invention.

FIG. 11 is a flowchart showing an operation of the comparing quantization index set selection part 021A specifically having the configuration example 1 in the third exemplary embodiment (selecting a quantization index set of a lower hierarchy of a quantization index with high appearance frequency).

Firstly, the image feature extraction device 01 calculates a hierarchical quantization index code of a group of images of a population from the group of images of the population, and supplies to the population quantization index appearance frequency calculation unit 03 (step C01). Next, the population quantization index appearance frequency calculation unit 03 is supplied as an input with the hierarchical quantization index code of the group of images of the population supplied by the image feature extraction device 01, calculates the appearance frequency of each quantization index in the group of images of the population as population quantization index appearance frequency, and supplies to the comparing quantization index set selection part 021A (step C02). Next, the candidate quantization index set selection unit 021A1 of the comparing quantization index set selection part 021A firstly selects a quantization index set of the highest hierarchy of the hierarchical quantization method as a candidate quantization index set, and supplies information on the selected candidate quantization index set to the defined condition determination unit 021A2 (step C03). Next, the defined condition determination unit 021A2 determines whether or not the candidate quantization index set represented by the information on the candidate quantization index set supplied by the candidate quantization index set selection unit 021A1 satisfies a defined condition having been defined in advance (step C04). When determining that the defined condition is not satisfied, the defined condition determination unit 021A2 obtains a quantization index with high appearance frequency from the candidate quantization index set based on the population quantization index appearance frequency supplied by the population quantization index appearance frequency calculation unit 03, and supplies (feeds back) the obtained quantization index to the candidate quantization index set selection unit 021A1 (step C05). The candidate quantization index set selection unit 021A1 replaces the quantization index (of a higher hierarchy) supplied by the defined condition determination unit 021A2 with a quantization index set of a lower hierarchy thereof to select as a candidate quantization index set, and supplies information on the selected candidate quantization index set to the defined condition determination unit 021A2 (step C06). Then, the operation proceeds to step C04 again. When determining that the defined condition is satisfied at step C04, the defined condition determination unit 021A2 outputs the candidate quantization index set as a comparing quantization index set. Then, the operation proceeds to step B02 of the flowchart showing the operation of the image feature comparison device 02 in the first exemplary embodiment shown in FIG. 8.

[Effect of Third Exemplary Embodiment]

Next, an effect of the third exemplary embodiment of the present invention will be described.

The third exemplary embodiment of the present invention has, in addition to the effect of the second exemplary embodiment, an effect that the comparing quantization index set selection part 021A selects a comparing quantization index so that the appearance frequencies of quantization indexes are as equal as possible based on population quantization index appearance frequency and it is consequently possible to increase identification capability as the degree of capability of identifying different images in a population, which is an image feature (a quantization index of each quantization target region) expressed by using the selected comparing quantization index. This is because in a case that the numbers of quantization indexes are identical, when there is a bias toward a specific quantization index (when the appearance frequency of a specific quantization index is high), the quantization index with high appearance frequency incidentally appears in common between different images with high probability, and identification capability lowers. Moreover, there is an effect that as identification capability of an image feature increases, the accuracy of determination of identity of images based on a calculated identity scale increases.

<Fourth Exemplary Embodiment>

Figure 12:
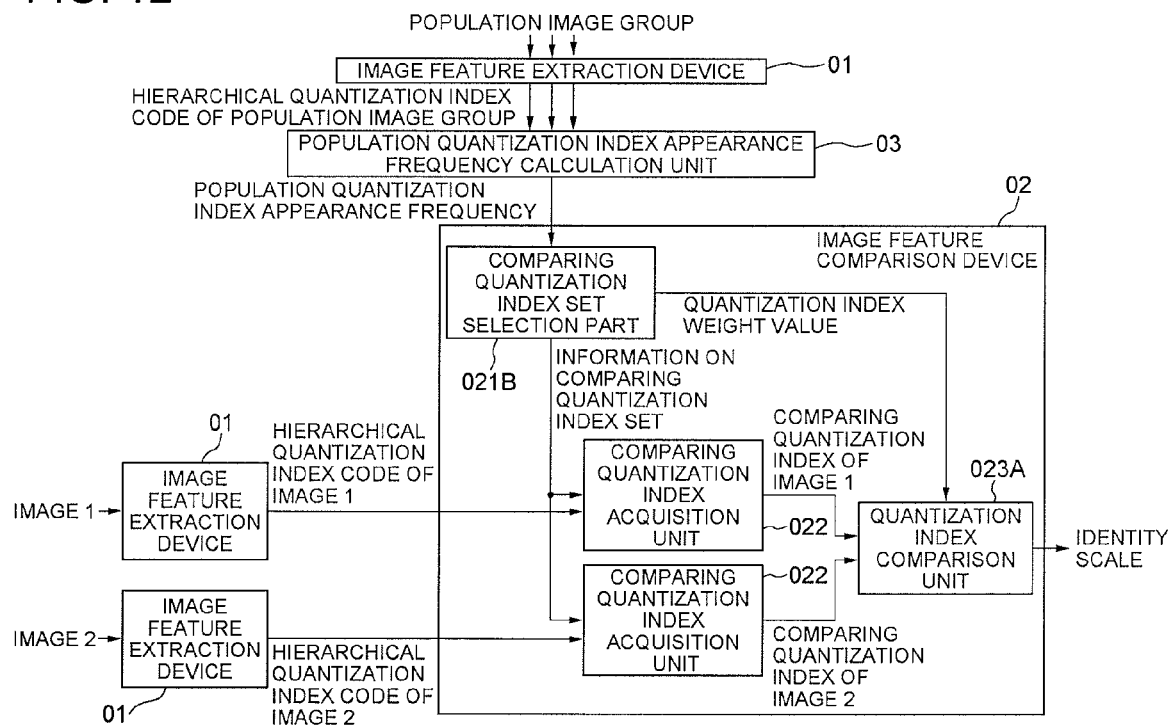
FIG. 12 is a block diagram showing a configuration of a fourth exemplary embodiment of the present invention.

Next, a fourth exemplary embodiment of the present invention will be described in detail with reference to the drawings. FIG. 12 is a block diagram showing a configuration of an image feature comparison device of an image identity scale calculation system according to the fourth exemplary embodiment. With reference to FIG. 12, the fourth exemplary embodiment of the present invention is different from the image feature comparison device 02 of the third exemplary embodiment in that the comparing quantization index set selection part 021A is replaced with a comparing quantization index set selection part 021B configured to further output a quantization index weight value and the quantization index comparison unit 023 is replaced with a quantization index comparison unit 023A configured to be further supplied with the quantization index weight value as an input. Since the other points are the same as in the third exemplary embodiment, only the different point from the third exemplary embodiment will be described below.

The comparing quantization index set selection part 021B, in addition to executing the operation of the comparing quantization index set selection part 021A of the third exemplary embodiment, calculates a weight value so that the weight value becomes smaller as the appearance frequency is higher for each quantization index of a selected comparing quantization index set, based on population quantization index set appearance frequency supplied by the population quantization index appearance frequency calculation unit 03, and supplies the calculated weight value of each quantization index as a quantization index weight value to the quantization index comparison unit 023A. Here, a weight value is made to be smaller as the appearance frequency is higher because it is highly probable that a quantization index with high appearance frequency may also be owned by another image with high probability and therefore it is less probable that the quantization index can contribute to identification from another image. Conversely, as the appearance frequency is lower, it is less probable that the quantization index is owned by another image and it is highly probable that the quantization index can contribute to identification from another image. Therefore, weight is made to be large. A quantization index weight value can be calculated by any method as far as calculated so that a weight value becomes smaller as the appearance frequency is higher (i.e., any calculation method based on a monotonically decreasing function with respect to the appearance frequency). For example, the quantization index weight value may be a value obtained by calculating the appearance probability of each quantization index from the population quantization index appearance frequency and subtracting the appearance probability from 1.

The quantization index comparison unit 023A compares comparing quantization indexes of two images (image 1 and image 2) supplied by the comparing quantization index acquisition units 022 for each corresponding quantization target region, obtains the number of quantization target regions whose quantization indexes coincide for each quantization index, and makes a quantization index weight value supplied by the comparing quantization index set selection part 021B act thereon, thereby calculating an identity scale. Here, an identity scale may be calculated by, for example, calculating the product of the number of quantization target regions whose quantization indexes coincide obtained for each quantization index and the quantization index weight value and adding the products.

The abovementioned operation is a desirable operation of the fourth exemplary embodiment, but another operation can also be executed. For example, the comparing quantization index set selection part 021B may set a weight value of a quantization index that is not included in a selected comparing quantization index to 0 (or makes the weight value low) and supply the weight values of all of the quantization indexes of the hierarchical quantization method (e.g., in FIG. 6, all of the quantization indexes 1 to 37) as quantization index weight values to the quantization index comparison unit 023A. In this case, since 0 (or as a low value) is supplied as a weight value of a quantization index that is not included in a selected comparing quantization index to the quantization index comparison unit 023A, information on the selected quantization index set is supplied indirectly to the quantization index comparison unit 023A. Therefore, the comparing quantization index set selection part 021B does not need to specially supply any information on the comparing quantization index set to the comparing quantization index acquisition unit 022, and the comparing quantization index acquisition unit 022 may acquire quantization indexes of all of the hierarchies of the hierarchical quantization method from an inputted hierarchical quantization index code, for each quantization target region, and supply to the quantization index comparison unit 023A. Then, the quantization index comparison unit 023A may compare quantization indexes of the respective hierarchies for each corresponding quantization target region, obtain the number of quantization target regions whose quantization indexes coincide for each quantization index, and make a quantization index weight value supplied by the comparing quantization index set selection part 021B act thereon, thereby calculating an identity scale.

[Effect of Fourth Exemplary Embodiment]

Next, an effect of the fourth exemplary embodiment of the present invention will be described.

The fourth exemplary embodiment of the present invention has, in addition to the effect of the third exemplary embodiment, an effect that the comparing quantization index set selection part 021B calculates a weight value for each quantization index of a selected comparing quantization index set based on population quantization index appearance frequency, and the quantization index comparison unit 023A makes the calculated weight value act to calculate an identity scale, whereby it is possible to make the accuracy of determination of identity of images based on the calculated identity scale higher than the accuracy of determination of identity of images based on the identity scale calculated in the third exemplary embodiment.

[Fifth Exemplary Embodiment]

Figure 13:
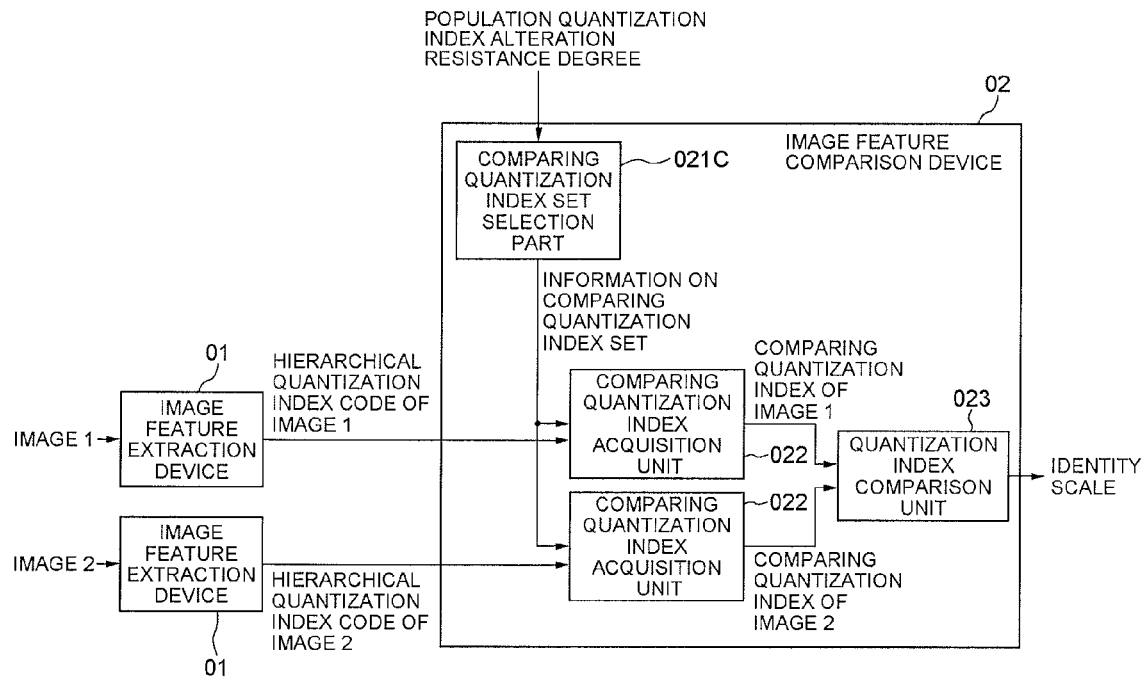
FIG. 13 is a block diagram showing a configuration of a fifth exemplary embodiment of the present invention.

Next, a fifth exemplary embodiment of the present invention will be described in detail with reference to the drawings. The fifth exemplary embodiment embodies population property information to be inputted and the comparing quantization index set selection part 021 in the image feature comparison device 02 of the second exemplary embodiment. An image feature extraction device in the fifth exemplary embodiment is the same as the image feature extraction device 01 of the first exemplary embodiment shown in FIG. 4. FIG. 13 is a block diagram showing a configuration of an image feature comparison device of an image identity scale calculation system according to the fifth exemplary embodiment. With reference to FIG. 13, the fifth exemplary embodiment of the present invention is different from the image feature comparison device 02 having the configuration of the second exemplary embodiment shown in FIG. 5 in that the comparing quantization index set selection part 021 is replaced with a comparing quantization index set selection part 021C. Since the other points are the same as in the second exemplary embodiment, only the different point from the second exemplary embodiment will be described.

Into the comparing quantization index set selection part 021C, population quantization index alteration resistance degree is inputted as population property information. Population quantization index alteration resistance degree represents the alteration resistance degree, which is a degree of resistance to various alteration processes of each quantization index of the hierarchical quantization method in a group of images of a population. For obtaining the alteration resistance degree of each quantization index of the hierarchical quantization method in a group of images of a population, for example, by executing various alteration processes on the group of images of the population (or a group of images obtained by properly sampling and extracting from the group of images of the population) to generate copy images, calculating a hierarchical quantization index code from the original images and the copy images by using the image feature extraction device 01, and measuring a ratio of coincidence of quantization indexes in corresponding quantization target regions for each quantization index, the measured ratio of coincidence of each quantization index may be regarded as the alteration resistance degree of each quantization index.

The comparing quantization index set selection part 021C selects a comparing quantization index set based on the inputted population quantization index alteration resistance degree so that a quantization index alteration resistance degree relating to a whole quantization index set having been selected becomes high. Information on the selected comparing quantization index set is supplied to the comparing quantization index acquisition unit 022. The comparing quantization index set selection part 021C is an embodiment of the comparing quantization index set selection part 021 of the second exemplary embodiment in a case that population property information to be inputted is specifically a population quantization index alteration resistance degree. Conditions for selection of the comparing quantization index set conform to the description of the second exemplary embodiment.

The comparing quantization index set selection part 021C selects a comparing quantization index set so that a quantization index alteration resistance degree relating to a whole quantization index set having been selected becomes high, whereby it is possible to make robustness as a degree of resistance of a quantization index to various alteration processes on an image high.

The comparing quantization index set selection part 021C, when selecting a comparing quantization index set so that a quantization index alteration resistance degree relating to a whole quantization index set having been selected becomes high based on population quantization index alteration resistance degree, for example, may select a comparing quantization index set so that a quantization index with low population quantization index alteration resistance degree is not included.

Further, the comparing quantization index set selection part 021C, when selecting a comparing quantization index set so that a quantization index alteration resistance degree relating to a whole quantization index set having been selected becomes high based on population quantization index alteration resistance degree, for example, may calculate a quantization index alteration resistance degree relating to the whole quantization index set having been selected as a candidate as a quantization index set alteration resistance degree, and select a quantization index set as a comparing quantization index set so that quantization index set alteration resistance degree becomes high based on the quantization index set alteration resistance degree. For example, the comparing quantization index set selection part 021C may calculate a quantization index set alteration resistance degree for each of quantization index sets of all combinations as candidates, and select a quantization index set whose quantization index set alteration resistance degree becomes the maximum as a comparing quantization index set.

A quantization index set alteration resistance degree as a quantization index alteration resistance degree relating to a whole quantization index set may be calculated by any method as far as calculated based on the alteration resistance degrees of the respective quantization indexes included in a quantization index set. For example, the quantization index set alteration resistance degree may be calculated as the average value of the alteration resistance degrees of the respective quantization indexes. Moreover, for example, a quantization index set alteration resistance degree may be calculated as the number of quantization indexes exceeding a certain fixed value or the ratio of such quantization indexes.

Further, the comparing quantization index set selection part 021C may select a comparing quantization index set by considering, in addition to the aforementioned quantization index set alteration resistance degree, for example, the number of quantization indexes included in a quantization index set selected as a candidate (or the depth of hierarchies of the selected hierarchical index set). This is because: the number of quantization indexes (or the depth of hierarchies) is information independent of a quantization index set alteration resistance degree as well as independent of a population; as the number of quantization indexes of a quantization index set becomes more (or the depth of hierarchies becomes more), identification capability as the degree of capability of identifying different images becomes higher but robustness as the degree of resistance of a quantization index to various alteration processes on an image becomes lower; and there is a case that it is better to select a comparing quantization index set by considering both the quantization index set alteration resistance degree and the number of the quantization indexes (or the depth of the hierarchies). For example, from the viewpoint of identification capability and robustness, an appropriate range of number of quantization indexes may be set (e.g., the number of quantization indexes is set to about 10) and, from quantization index sets satisfying the condition, a set whose quantization index set alteration resistance degree calculated by the aforementioned method for calculating a quantization index set alteration resistance becomes high may be selected as a comparing quantization index set.

Further, the comparing quantization index set selection part 021C may calculate, in addition to the aforementioned quantization index set alteration resistance degree, the appearance frequency uniformity degree described in the third exemplary embodiment (in this case, the comparing quantization index set selection part 021C also needs to be supplied with the population quantization index appearance frequency as an input) and, in consideration of both the quantization index set alteration resistance degree and the appearance frequency uniformity degree, select a comparing quantization index set. The comparing quantization index set selection part 021C may select, for example, a quantization index set that the quantization index set alteration resistance degree becomes high and the appearance frequency uniformity degree becomes high, as a comparing quantization index set. Moreover, for example, the comparing quantization index set selection part 021C may select a comparing quantization index set so that a quantization index with high appearance frequency uniformity degree and with low population quantization index alteration resistance degree is not included.

Further, the comparing quantization index set selection part 021C may, until a defined condition is satisfied, select a quantization index set of a lower hierarchy in the order from a quantization index set of the highest hierarchy of the hierarchical quantization method so that a quantization index alteration resistance degree relating to a whole quantization index set based on the population quantization index alteration resistance degree supplied as an input, thereby selecting a comparing quantization index set. Here, the defined condition may be, for example, whether or not the quantization index set alteration resistance degree, the alteration resistance degree of each quantization index, or the number of quantization indexes included in a quantization index set (or the depth of hierarchies), which have been described above, or a combination thereof is within a previously defined value range. Moreover, the defined condition may be a condition based on the appearance frequency uniformity degree of a quantization index set described in the third exemplary embodiment. For example, the comparing quantization index set selection part 021C may set the minimum value of the quantization index set alteration resistance degree and the minimum value of the number of quantization indexes and, until a quantization index set whose number of quantization indexes exceeds the minimum value and whose quantization index set alteration resistance degree is not lower than the minimum value appears, select a quantization index set of a lower hierarchy in the order from a quantization index set of the highest hierarchy. Moreover, for example, the defined condition may be like the defined condition described in <Configuration Example 1 of Comparing Quantization Index Set selection part 021A> of the third exemplary embodiment. (In a case that a plurality of quantization index sets calculated by a plurality of different quantization methods exist in a lower hierarchy of a certain quantization index, one of the sets is selected.)

As a method for selecting a quantization index set of a lower hierarchy based on population quantization index alteration resistance degree, for example, a quantization index set of a lower hierarchy of a quantization index with high alteration resistance degree in a present candidate quantization index set may be selected (the quantization index may be replaced with a quantization index set of a lower hierarchy thereof). With reference to FIG. 6, for example, in a case that a present candidate quantization index set is $\{1, 2, 3, 4, 5\}$ and the alteration resistance degree of quantization index 3 is the largest thereamong, quantization index 3 may be selected as a quantization index to be replaced with a quantization index set of a lower hierarchy to select $\{1, 2, 11, 12, 4, 5\}$ as a new candidate quantization index set. Moreover, at the time of the selection, the quantization index may be selected in consideration of the number of quantization indexes of a quantization index set of a lower hierarchy.

Further, as another method for selecting a quantization index set of a lower hierarchy based on population quantization index alteration resistance degree, for example, in a present candidate quantization index set, a quantization index that increases (e.g., maximizes) a quantization index set alteration resistance degree as a quantization index alteration resistance degree relating to a whole candidate quantization index set to be newly generated when being replaced with a quantization index set of a lower hierarchy may be selected as a quantization index to be replaced with a quantization index set of a lower hierarchy. With reference to FIG. 6, for example, in a case that a present candidate quantization index set is $\{1, 2, 3, 4, 5\}$ and, among set $\{6, 7, 2, 3, 4, 5\}$ generated by replacing quantization index 1 with a quantization index set of a lower hierarchy, set $\{1, 8, 9, 10, 3, 4, 5\}$ generated by replacing quantization index 2 with a quantization index set of a lower hierarchy, set $\{1, 2, 11, 12, 4, 5\}$ generated by replacing quantization index 3 with a quantization index set of a lower hierarchy, set $\{1, 2, 3, 13, 14, 15, 5\}$ or $\{1, 2, 3, 16, 17, 5\}$ generated by replacing quantization index 4 with a quantization index set of a lower hierarchy, and set $\{1, 2, 3, 4, 18, 19, 20, 21\}$ generated by replacing quantization index 5 with a quantization index set of a lower hierarchy, the quantization index set alteration resistance degree of set$\{1, 2, 11, 12, 4, 5\}$ generated by replacing quantization index 3 with a quantization index set of a lower hierarchy becomes the highest, quantization index 3 may be selected as a quantization index to be replaced with a quantization index set of a lower hierarchy to select $\{1, 2, 11, 12, 4, 5\}$ as a new candidate quantization index set. Moreover, at the time of the selection, the quantization index may be selected in consideration of the number of quantization indexes included in a newly generated candidate quantization index set.

Further, as another method for selecting a quantization index set of a lower hierarchy based on population quantization index alteration resistance degree, for example, a quantization index to be replaced with a quantization index set of a lower hierarchy may be selected from a present candidate quantization index set based on the alteration resistance degree of a quantization index of a lower hierarchy of each quantization index. For example, a quantization index alteration resistance degree relating to a whole quantization index set of a lower hierarchy of each quantization index (e.g., an average value) may be calculated to select a quantization index having a set whose quantization index alteration resistance degree is the largest as a lower hierarchy thereof. With reference to FIG. 6, for example, in a case that a present candidate quantization index set is {1, 2, 3, 4, 5} and, among quantization index sets {6, 7}, {8, 9, 10}, {11, 12}, {13, 14, 15} or {16, 17}, and {18, 19, 20, 21} of lower hierarchies of the respective quantization indexes, the quantization index alteration resistance degree relating to the whole quantization index set {11, 12} of a lower hierarchy of quantization index 3 (e.g., an average value) is the largest, quantization index 3 may be selected as a quantization index to be replaced with a quantization index set of a lower hierarchy to select {1, 2, 11, 12, 4, 5} as a new candidate quantization index set. Moreover, at the time of the selection, the number of quantization indexes of a quantization index set of a lower hierarchy may be considered.

Further, at the time of selection of a quantization index set of a lower hierarchy based on the population quantization index alteration resistance degree, a quantization index to be replaced with a quantization index set of a lower hierarchy may be selected in consideration of, in addition to the population quantization index alteration resistance degree, the population quantization index appearance frequency described in the third exemplary embodiment (in this case, the comparing quantization index set selection part 021C also needs to be supplied with population quantization index appearance frequency as an input).

The configuration of the comparing quantization index set selection part 021C in the case of employing a method of selecting a quantization index set of a lower hierarchy in the order from a quantization index set of the highest hierarchy of the hierarchical quantization method based on population quantization index alteration resistance degree until a defined condition is satisfied is almost the same as that of the comparing quantization index set selection part 021A of the third exemplary embodiment shown in FIG. 10, except that a specific operation of each of the parts is different. That is to say, the comparing quantization index set selection part 021C includes a candidate quantization index set selection unit that selects a candidate quantization index set, and a defined condition determination unit that determines whether or not a quantization index set selected as a candidate satisfies a defined condition. A specific operation of each of the units conforms to the aforementioned description, and a detailed description will be omitted here.

[Effect of Embodiment of Fifth Exemplary Embodiment]

Next, an effect of the fifth exemplary embodiment of the present invention will be described.

The fifth exemplary embodiment of the present invention has, in addition to the effect of the second exemplary embodiment, an effect that the comparing quantization index set selection part 021C selects a comparing quantization index set based on population quantization index alteration resistance degree so that a quantization index alteration resistance degree relating to a whole quantization index set becomes higher, whereby it is possible to increase robustness of an image feature expressed by a selected comparing quantization index (a quantization index of each quantization target region) against various alteration processes on population. Moreover, there is an effect that, as robustness of an image feature increases, the accuracy of determination of identity of images based on a calculated identity scale increases.

[Sixth Exemplary Embodiment]

Figure 14:
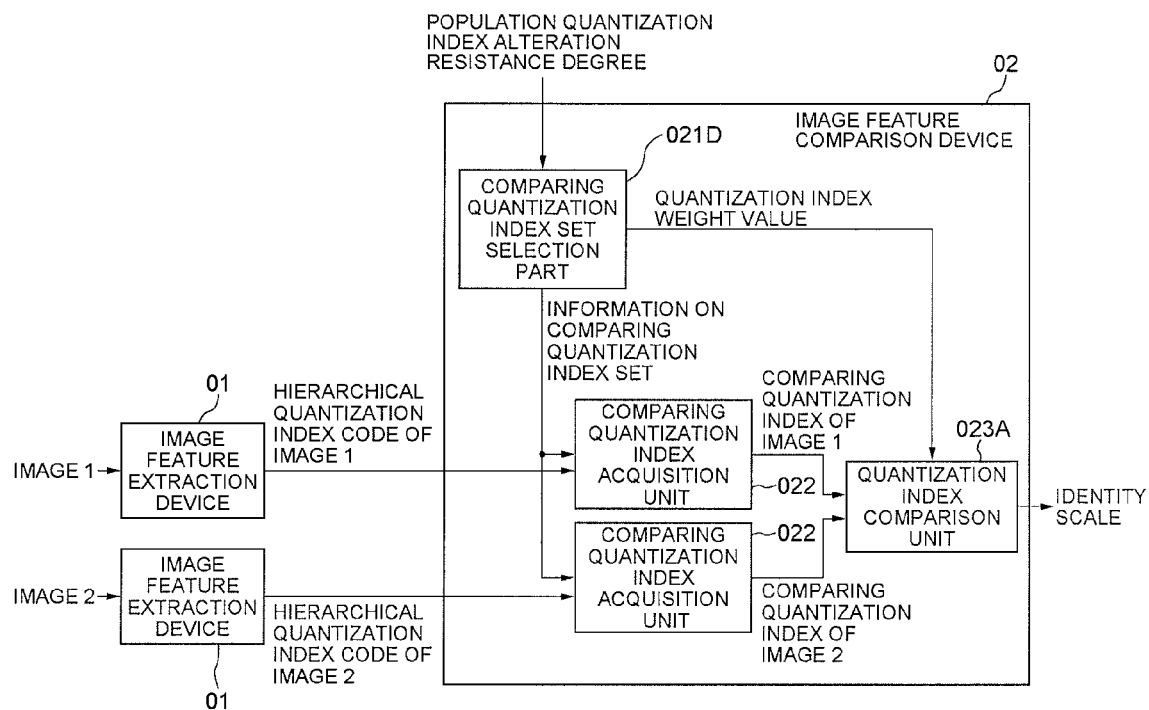
FIG. 14 is a block diagram showing a configuration of a sixth exemplary embodiment of the present invention.

Next, a sixth exemplary embodiment of the present invention will be described in detail with reference to the drawings. FIG. 14 is a block diagram showing a configuration of an image feature comparison device of an image identity scale calculation system according to the sixth exemplary embodiment. With reference to FIG. 14, the sixth exemplary embodiment of the present invention is different from the image feature comparison device 02 of the fifth exemplary embodiment in that the comparing quantization index set selection part 021C is replaced with a comparing quantization index set selection part 021D configured to further output a quantization index weight value and the quantization index comparison unit 023 is replaced with a quantization index comparison unit 023A configured to be further supplied with the quantization index weight value as an input. Since the other parts of the sixth exemplary embodiment are the same as in the fifth exemplary embodiment, only the different point from the fifth exemplary embodiment will be described below.

In addition to executing the operation of the comparing quantization index set selection part 021C of the fifth embodiment, the comparing quantization index set selection part 021D calculates a weight value based on a population quantization index alteration resistance degree supplied as an input so that the weight value becomes larger as the alteration resistance degree is higher for each quantization index of a selected comparing quantization index set, and supplies to the quantization index comparison unit 023A. The quantization index weight value may be calculated by any method as far as calculated so that the weight value becomes larger as the degree of alteration resistance is higher (i.e., may be calculated by any calculation method based on a monotonically increasing function with respect to the alteration resistance degree). For example, population quantization index alteration resistance degree may be a quantization index weight value.

Since the quantization index comparison unit 023A is identical to the quantization index comparison unit 023A of the fourth exemplary embodiment, a description thereof will be omitted here.

Although the aforementioned operation is a desirable operation of the sixth exemplary embodiment, another operation may be performed. For example, the comparing quantization index set selection part 021D may set a weight value of a quantization index that is not included in a selected comparing quantization index set to zero (or set the weight value to a low value), and supply the weight values of all quantization indexes of the hierarchical quantization method e.g., with reference to FIG. 6, all of the quantization indexes 1 to 37) as quantization index weight values to the quantization index comparison unit 023A. In this case, since 0 (or a low value) is supplied as the weight value of the quantization index that is not included in the selected comparing quantization index set to the quantization index comparison unit 023A, information on the selected comparing quantization index set is indirectly supplied to the quantization index comparison unit 023A. Therefore, the comparing quantization index set selection part 021D does not need to supply anything to the comparing quantization index acquisition unit 022 as information on the comparing quantization index acquisition unit 022, and the comparing quantization index acquisition unit 022 may acquire quantization indexes of all of the hierarchies of the hierarchical quantization method from an inputted hierarchical quantization index code for each quantization target region, and supply to the quantization index comparison unit 023A. Then, the quantization index comparison unit 023A may compare quantization indexes of the respective hierarchies for each corresponding quantization target region, obtain the number of quantization target regions whose quantization indexes coincide, and make a quantization index weight value supplied from the comparing quantization index set selection part 021D act thereon, thereby calculating an identity scale.

[Effect of Sixth Exemplary Embodiment]

Next, an effect of the sixth exemplary embodiment of the present invention will be described.

The sixth exemplary embodiment of the present invention has, in addition to the effect of the fifth exemplary embodiment, an effect that the comparing quantization index set selection part 021D calculates a weight value of each quantization index of a selected comparing quantization index set based on population quantization index alteration resistance degree and the quantization index comparison unit 023A makes the calculated weight value act to calculate an identity scale, whereby it is possible to make the accuracy of determination of identity of images based on the calculated identity scale higher than the accuracy of determination of identity of images based on an identity scale calculated by the fifth exemplary embodiment.

[Seventh Exemplary Embodiment]

Figure 15:
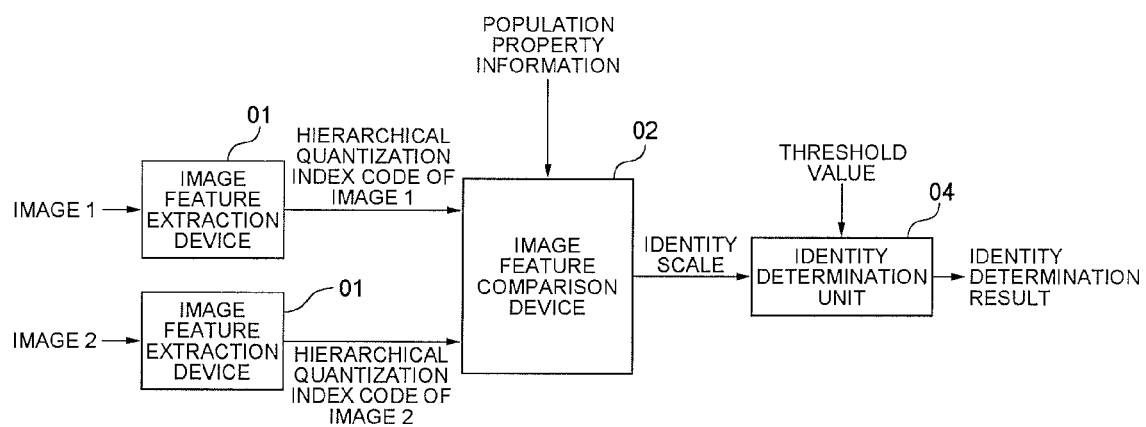
FIG. 15 is a block diagram showing a configuration of a seventh exemplary embodiment of the present invention.

Next, a seventh exemplary embodiment of the present invention will be described in detail with reference to the drawings. The seventh exemplary embodiment relates to an image identity determining system that determines whether images are identical or not by using an image identity scale calculation system of any of the second to sixth exemplary embodiments. FIG. 15 is a block diagram showing a configuration of an image identity determining system according to the seventh exemplary embodiment. With reference to FIG. 15, the seventh exemplary embodiment of the present invention is different in that an identity determination unit 04 is added to the configuration of any of the second to sixth exemplary embodiment of the present invention. Since the other points are the same as in the second to sixth exemplary embodiments, the different point from the second to sixth exemplary embodiment will be described.

The identity determination unit 04 compares an identity scale of two images (image 1 and image 2) outputted by the image feature comparison device 02 with a defined threshold value supplied as an input, determines whether the two images are identical or not, and outputs the result of the determination as an identity determination result. The identity determination unit 04 determines that the two images are identical when the identity scale is larger than the threshold value, and determines that the two images are not identical when the identity scale is smaller than the threshold value. The threshold value inputted here may vary depending on a comparing quantization index set selected by the comparing quantization index set selection part 021. Moreover, the threshold value may be set by learning by using a group of images for learning in advance.

[Effect of Seventh Exemplary Embodiment]

Next, an effect of the seventh exemplary embodiment of the present invention will be described.

In the seventh exemplary embodiment of the present invention, determination of identity of images is performed based on an identity scale calculated by using an identity scale calculated by the image identity scale calculation system of any of the second to sixth exemplary embodiments, so that determination of identity of images is performed based on an identity scale having the effects of the second to sixth exemplary embodiments. There is an effect that determination of identity of images is performed so as to be appropriate and optimum for each population and it is possible to keep determination of identity of images at high precision.

[Eighth Exemplary Embodiment]

Figure 16:
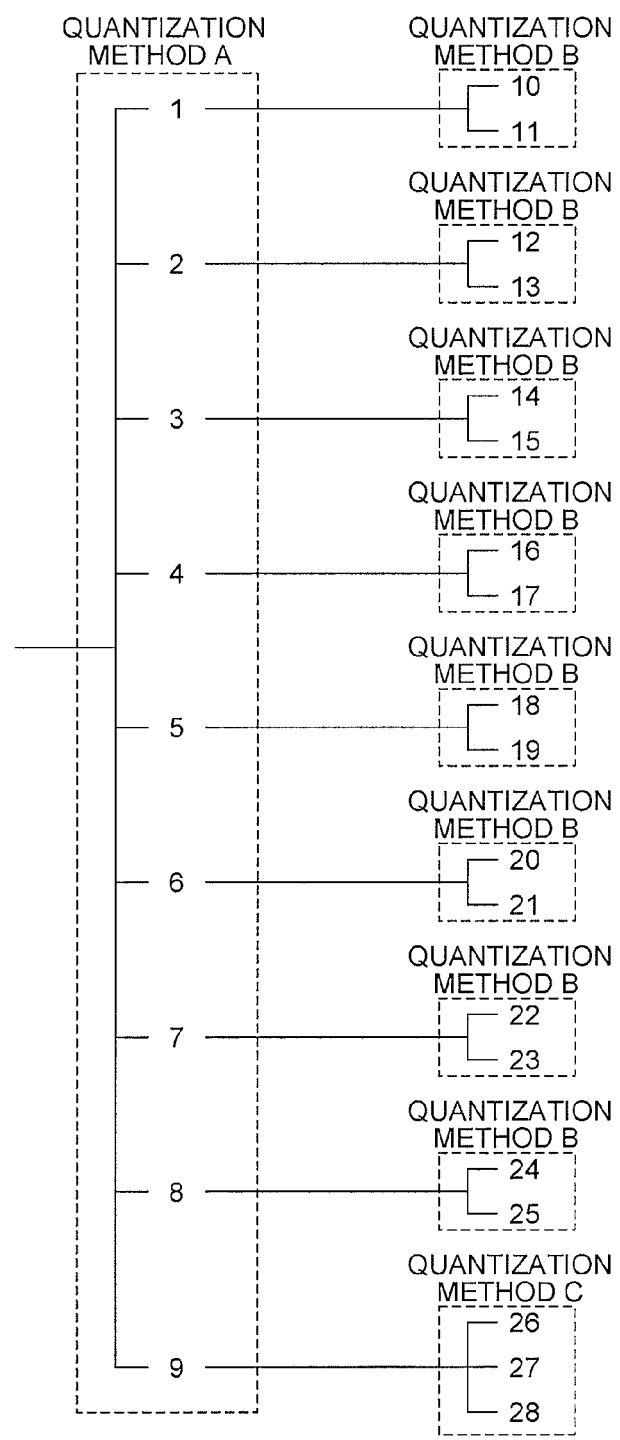
FIG. 16 is a diagram showing a specific example of a hierarchical quantization method used in an eighth exemplary embodiment of the present invention.

Next, with reference to FIG. 16, an eighth exemplary embodiment of the present invention will be described. The eighth exemplary embodiment is such an embodiment that a hierarchical quantization method as shown in FIG. 16 is used in the image identity scale calculation system of any of the second to seventh exemplary embodiments described above. In FIG. 16, quantization method A is a quantization method for the highest hierarchy. In quantization method A, a feature relating to the magnitude and direction of gradient (edge) of an image in a quantization target region is calculated, the sample is classified into quantization index 9 representing "no gradient" in a case that the magnitude is less than a defined level, and a dominant gradient direction is quantized (classified) into eight directions (e.g., a horizontal right direction of an image is set to 0 degree, and in the order from 45 degrees, 90 degrees, 135 degrees, 180 degrees, 225 degrees, 275 degrees, 315 degrees in the clockwise direction) in the other cases. That is to say, the sample is classified into quantization index 1 when a dominant gradient direction is quantized to 0 degree, classified into quantization index 2 when quantized to 45 degrees, classified into quantization index 3 when quantized to 90 degrees, classified into quantization index 4 when quantized to 135 degrees, classified into quantization index 5 when quantized to 180 degrees, classified into quantization index 6 when quantized to 225 degrees, classified into quantization index 7 when quantized to 270 degrees, and classified into quantization index 8 when quantized to 315 degrees.

As a specific method for calculating the direction of dominant gradient (edge) of an image in a quantization target region, for example, the magnitude and direction of gradient in the center of the quantization target region may be calculated and obtained. Moreover, for example, by calculating the magnitude and direction of gradient (edge) for each of a plurality of small regions within a quantization target region (e.g., each pixel within a quantization target region), quantizing the direction of the gradient to eight directions when the magnitude is a defined level or more, and voting a histogram having a bin corresponding to each of the eight directions, a direction having a largest number of votes may be regarded as a dominant direction (classified into quantization index 9 representing "no gradient" when the number of votes is less than a defined number). In this example, a dominant direction is quantized to eight directions, but may be quantized to four directions, sixteen directions, and any number of directions.

In a case that a sample is not classified into quantization index 9 representing "no gradient" (in a case that there is gradient), that is, in a case that a sample is classified into any of quantization indexes 1 to 8, quantization by quantization method B as a quantization method for a lower hierarchy is executed. In quantization method B, quantization is executed based on a secondary feature regarding gradient. For example, in quantization method B, samples may be classified into two based on the level of magnitude of gradient. Moreover, for example, samples may be classified into two based on whether or not a secondary dominant direction of gradient with respect to the dominant gradient direction classified in the highest hierarchy exists (whether the magnitude of a secondary dominant direction of gradient is a defined level or more). Moreover, the secondary dominant gradient direction may be quantized. In FIG. 16, the number of classifications is two but not necessarily two.

In FIG. 16, quantization method B is uniformly employed as a quantization method for lower hierarchies of all of quantization indexes 1 to 8, but quantization method B may be employed, for example, only when a dominant gradient direction is a specified angle. For example, only for quantization indexes 1, 3, 5 and 7 corresponding to 0 degree, 90 degrees, 180 degrees and 270 degrees that are gradient directions often existing in a general image (i.e., classified with higher frequency) (an image of an artificial object includes these four gradient directions because an artificial object includes a number of edges of horizontal directions), quantization method B may be employed as a quantization method for lower hierarchies thereof (quantization indexes 2, 4, 6 and 8 other than the abovementioned indexes may be of the lowest hierarchies). Moreover, for example, quantization method B may be employed for lower hierarchies of all of quantization indexes 1 to 8 and, for quantization indexes 10, 11, 14, 15, 18, 19, 22 and 23 whose quantization indexes of the highest hierarchies are 1, 3, 5 and 7, a quantization method for further lower hierarchies may be employed. This is because regarding a quantization index to which samples are supposed to be classified with higher frequency in general, it is effective to make it possible to classify more closely.

In a case that a sample is classified into quantization index 9 representing no gradient, quantization by quantization method C as a quantization method for a lower hierarchy thereof is executed. In the quantization method C, quantization is executed based on a different feature from the gradient (edge) of an image. For example, in quantization method C, quantization may be executed based on luminance of an image in a quantization target region. For example, quantization into N levels (N denotes a numerical value of two or more) may be executed based on an average luminance value of an image in a quantization target region. Moreover, for example, in the quantization method C, quantization may be executed based on color information of an image in a quantization target region. For example, a feature relating to a hue may be extracted from an image of a quantization target region to execute quantization based on a hue angle. In FIG. 16, the number of classifications by classification method C is three, but is not necessarily three.

The quantization method for the highest hierarchy in the hierarchical quantization method described herein is based on the direction of gradient (edge), because a feature relating to the gradient (edge) of an image, especially, a feature relating to the direction of gradient (edge) is generally robust to various alteration processes such as compression of an image, a filtering process like blurring, brightness adjustment, and color tone adjustment. Therefore, a quantization method for lower hierarchies of quantization indexes 1 to 8 that dominant gradient directions exist is also based on gradient (edge) as a robust feature (the magnitude of gradient, the direction of secondary dominant gradient). Only in a case that a sample is classified into quantization index 9 representing no gradient, information on gradient cannot be used as a quantization method for a lower hierarchy (since there is no gradient), quantization is executed based on a feature (luminance, color information, and the like) other than gradient.

[Ninth Exemplary Embodiment]

Next, with reference to FIGS. 17A to 17C, a ninth exemplary embodiment of the present invention will be described. The ninth exemplary embodiment is an embodiment using data structures as shown in FIGS. 17A to 17C as a data structure in a storing unit that stores a hierarchical quantization index code generated by the image feature extraction device in any of the image identity scale calculation systems of the second to eighth exemplary embodiments described above. FIG. 17A shows an example of a quantization target region set on an image. In this example, each of regions obtained by dividing the image into four like a matrix is one quantization target region. In a case that the number of quantization target regions per image is thus prefixed, it is possible as shown in FIG. 17B to store a hierarchical quantization index code into the storing unit by using a data structure in which quantization indexes extracted from the respective quantization target regions are arranged in a predetermined order. Here, the predetermined order may be any order as far as previously determined. For example, the quantization indexes are arranged in the order of quantization target region (1), quantization target region (2), quantization target region (3), and quantization target region (4).

Further, in a case that the number of quantization target regions per image is variable, it is possible as shown in FIG. 17C to store a hierarchical quantization index code into the storing unit by using a data structure in which the number of quantization target regions per image is held into a top part and then quantization indexes extracted from the respective quantization target regions are arranged in a predetermined order.

Each of the quantization indexes may include only a quantization index of the lowest hierarchy, or may include quantization indexes of all of the hierarchies. Taking the hierarchical quantization method shown in FIG. 16 as an example, in a case that quantization index 11 is obtained for quantization target region (1), only quantization index 11 may be housed or quantization indexes 1 and 11 may be housed into quantization index (1).

[Tenth Exemplary Embodiment]

Figure 18:
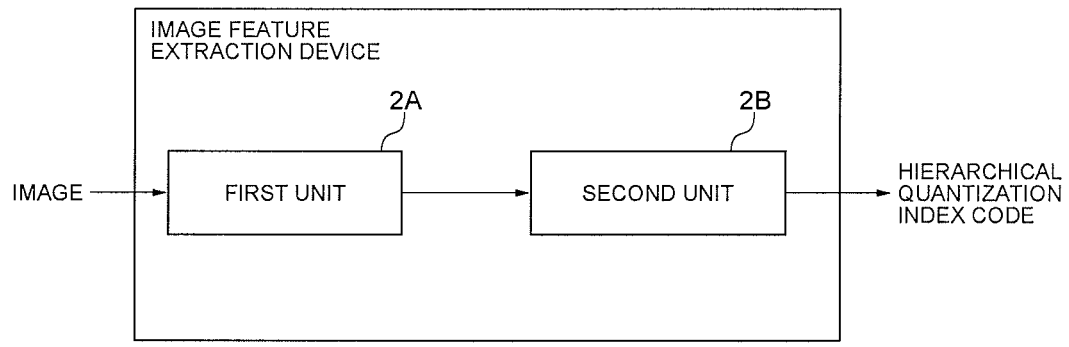
FIG. 18 is a block diagram showing a configuration of a tenth exemplary embodiment of the present invention.

Next, a tenth exemplary embodiment of the present invention will be described with reference FIG. 18. FIG. 18 is a block diagram showing a configuration of an image identity scale calculation system of this embodiment. In this embodiment, the aforementioned image identity scale calculation system will be schematically described.

An image feature extraction device according to this embodiment is configured to execute hierarchical quantization and calculation of quantization indexes of a plurality of hierarchies in accordance with a previously defined hierarchical quantization method for each quantization target region of an image, and execute output of a hierarchical quantization index code, which is an encoding allowing unique specification of the quantization indexes of the respective hierarchies of each quantization target region.

Further, the image feature extraction device includes a first unit configured to execute the calculation, and a second unit configured to execute the output.

Further, the image feature extraction device includes: a next-hierarchy quantization method selection unit configured to, when a quantization index of a higher hierarchy is supplied as a feedback, select a quantization method for a lower hierarchy corresponding to the supplied quantization index and, when a quantization index is not supplied, select a quantization method for a highest hierarchy in accordance with the hierarchical quantization method for each quantization target region; a feature extraction unit configured to extract a feature used by the selected quantization method from the inputted image for each quantization target region; a quantization index calculation unit configured to, for each quantization target region, quantize the extracted feature in accordance with the selected quantization method to calculate a quantization index and, in a case that the calculated quantization index is not of a lowest hierarchy, supply the quantization index to the next-hierarchy quantization method selection unit as a feedback; and a hierarchical quantization index code output unit configured to, when the quantization indexes of the respective hierarchies are calculated for each quantization target region, calculate and output the hierarchical quantization index code that is the encoding allowing unique specification of the quantization indexes of the respective hierarchies of each quantization target region.

Further, the image feature extraction device has a configuration that the quantization target region is one or a plurality of local regions of the image.

Further, the image feature extraction device has a configuration that the hierarchical quantization method is composed of quantization methods of calculating more resistant quantization indexes to various alteration processes on the image in higher hierarchies.

Further, the image feature extraction device has a configuration that each of the quantization methods for the respective hierarchies of the hierarchical quantization method is a quantization method of almost uniformly classifying into a plurality of quantization indexes corresponding to the quantization method, in a general image that does not suppose a specific population.

Further, an image feature extraction method as another embodiment of the present invention executed by the operation of the aforementioned image feature extraction device includes: executing hierarchical quantization and calculation of quantization indexes of a plurality of hierarchies in accordance with a previously defined hierarchical quantization method for each quantization target region of an image; and outputting a hierarchical quantization index code, which is an encoding allowing unique specification of the quantization indexes of the respective hierarchies of each quantization target region.

Further, the image feature extraction method includes: when a quantization index of a higher hierarchy is supplied as a feedback, selecting a quantization method for a lower hierarchy corresponding to the supplied quantization index and, when a quantization index is not supplied, selecting a quantization method for a highest hierarchy in accordance with the hierarchical quantization method for each quantization target region, by a next-hierarchy quantization method selection unit; extracting a feature used by the selected quantization method from the inputted image for each quantization target region, by a feature extraction unit; for each quantization target region, executing quantization of the extracted feature in accordance with the selected quantization method to calculate a quantization index and, in a case that the calculated quantization index is not of a lowest hierarchy, supplying the quantization index as a feedback to the next-hierarchy quantization method selection unit, by a quantization index calculation unit; and when the quantization indexes of the respective hierarchies are calculated for each quantization target region, calculating and outputting the hierarchical quantization index code that is the encoding allowing unique specification of the quantization indexes of the respective hierarchies of each quantization target region, by a hierarchical quantization index code output unit.

Further, the aforementioned image feature extraction device can be realized by installing a program into a computer. To be specific, a computer program product as another embodiment of the present invention includes computer implementable instructions for causing a computer to function as: a first unit configured to execute hierarchical quantization and calculation of quantization indexes of a plurality of hierarchies in accordance with a previously defined hierarchical quantization method for each quantization target region of an image; and a second unit configured to output a hierarchical quantization index code, which is an encoding allowing unique specification of the quantization indexes of the respective hierarchies of each quantization target region.

Further, the computer program product has a configuration that:

the first unit includes:

a next-hierarchy quantization method selection unit configured to, when a quantization index of a higher hierarchy is supplied as a feedback, select a quantization method for a lower hierarchy corresponding to the supplied quantization index and, when a quantization index is not supplied, select a quantization method for a highest hierarchy in accordance with the hierarchical quantization method for each quantization target region;

a feature extraction unit configured to extract a feature used by the selected quantization method from the inputted image for each quantization target region; and a quantization index calculation unit configured to, for each quantization target region, quantize the extracted feature in accordance with the selected quantization method to calculate a quantization index and, in a case that the calculated quantization index is not of a lowest hierarchy, supply the quantization index as a feedback to the next-hierarchy quantization method selection unit; and the second unit includes a hierarchical quantization index code output unit configured to, when the quantization indexes of the respective hierarchies are calculated for each quantization target region, calculate and output the hierarchical quantization index code that is the encoding allowing unique specification of the quantization indexes of the respective hierarchies of each quantization target region.

Further, a data structure as another embodiment of the present invention is a data structure configured to store an image feature representing a feature of an image into a storing unit, and includes a hierarchical quantization index code, which is an encoding allowing unique specification of quantization indexes of a plurality of hierarchies calculated by executing hierarchical quantization for each quantization target region of an image in accordance with a previously defined hierarchical quantization method.

Inventions of the image feature extraction method, computer program product or data structure having the aforementioned configurations produce effects like the image feature extraction device described above, and therefore, can achieve the aforementioned object of the present invention.

Although the present invention has been explained above in the respective embodiments, the present invention is not limited to the aforementioned embodiments. The configuration and the details of the present invention can be altered in various manners that can be understood by one skilled in the art within the scope of the present invention.

The present invention is based upon and claims the benefit of priority from Japanese patent application No. 2008-223389, filed on Sep. 1, 2008, the disclosure of which is incorporated herein in its entirety by reference.

For example, the present invention can be used for detection of illegal copy of images and moving images. For example, the present invention can be used for a system that detects illegal posting of images and moving images to an image/moving image-sharing service and the like on the Internet. Moreover, since it is possible to detect a link between an original image/moving image and an edited image/moving image in production of an image and a moving image (e.g., at a broadcast station), it is also possible to use as a system that manages an edition history.

The invention claimed is:

1. An image feature extraction device for determining if a first image is a copy of a second image, the device comprising:

first means for carrying out a respective set of classifying processes for each of a plurality of target regions of the first image, each classifying process generating one or more quantization indexes as a function of (a) a feature associated with the classifying process and (b) a quantization method associated with the classifying process, each set of classifying processes including at least two classifying processes carried out in an hierarchical sequence, at least one lower hierarchy classifying process being selected as a function of the quantization index generated by a higher hierarchy classifying process in the same set of classifying processes, the first means comprising:

a next-hierarchy quantization method selection unit configured to, when a quantization index generated by a higher hierarchy classifying process is supplied as a feedback, select a lower hierarch classifying process corresponding to the supplied quantization index and, when a quantization index is not supplied, select a highest hierarchy classifying process for each quantization target region;

a feature extraction unit configured to extract a feature used by the selected classifying process from the first image for each quantization target region; and a quantization index calculation unit configured to, for each quantization target region, quantize the extracted feature in accordance with the selected quantization method to calculate a quantization index and, in a case that the calculated quantization index is not of a lowest hierarchy, supply the quantization index to the next-hierarchy quantization method selection unit as a feedback; and second means for outputting a hierarchical quantization index code comprising a set of quantization indexes including at least one quantization index generated by a lowest hierarchy classifying process for each target region.

2. The image feature extraction device according to claim 1, wherein the first and second means comprise a programmed computer.

3. The image feature extraction device according to claim 1, wherein each quantization target region is a respective local area of the image.

4. The image feature extraction device according to claim 1, wherein the hierarchical classifying processes for the higher hierarchies is more resistant to various alteration processes applied to the first image than the hierarchical classifying processes used in the lower hierarchy classifying processes.

5. A method for extracting an image feature of a first image to determine if the first image is a copy of a second image, the method comprising:

carrying out a respective set of classifying processes for each of a plurality of target regions of the first image, each classifying process generating one or more quantization indexes as a function of (a) a feature associated with the classifying process and (b) a quantization method associated with the classifying process, each set of classifying processes including at least two classifying processes carried out in an hierarchical sequence, at least one lower hierarchy classifying process being selected as a function of the quantization index generated by a higher hierarchy classifying process in the same set of classifying processes, the step of carrying out a respective set of classifying processes comprising:

when a quantization index generated by a higher hierarchy classifying process is supplied as a feedback, selecting a lower hierarch classifying process corresponding to the supplied quantization index and, when a quantization index is not supplied, selecting a highest hierarchy classifying process for each quantization target region;

extracting a feature used by the selected classifying process from the first image for each quantization target region; and for each quantization target region, quantizing the extracted feature in accordance with the selected quantization method to calculate a quantization index and, in a case that the calculated quantization index is not of a lowest hierarchy, supplying the quantization index as a feedback to the selecting step; and outputting a hierarchical quantization index code comprising a set of quantization indexes including at least one quantization index generated by a lowest hierarchy classifying process for each target region.

6. A non-transitory computer-readable medium storing a program comprising instructions for causing a computer to:

carry out a respective set of classifying processes for each of a plurality of target regions of the first image, each classifying process generating one or more quantization indexes as a function of (a) a feature associated with the classifying process and (b) a quantization method associated with the classifying process, each set of classifying processes including at least two classifying processes carried out in an hierarchical sequence, at least one lower hierarchy classifying process being selected as a function of the quantization index generated by a higher hierarchy classifying process in the same set of classifying processes, one or more of the classifying processes including the following steps:

when a quantization index generated by a higher hierarchy classifying process is supplied as a feedback, select a lower hierarch classifying process corresponding to the supplied quantization index and, when a quantization index is not supplied, select a highest hierarchy classifying process for each quantization target region;

extract a feature used by the selected classifying process from the first image for each quantization target region; and for each quantization target region, quantize the extracted feature in accordance with the selected quantization method to calculate a quantization index and, in a case that the calculated quantization index is not of a lowest hierarchy, supply the quantization index as a feedback to the selecting step; and output a hierarchical quantization index code comprising a set of quantization indexes including at least one quantization index generated by a lowest hierarchy classifying process for each target region.

* * * * *